(12) United States Patent
Gallagher et al.

(10) Patent No.: US 11,730,144 B2
(45) Date of Patent: Aug. 22, 2023

(54) ORAL HYGIENE APPLIANCE

(71) Applicants: John Henry Gallagher, Haverford, PA (US); Roman Bielski, Coopersburg, PA (US); John Newport, Chadds Ford, PA (US); David Joseph Stanley, Woolwich Township, PA (US)

(72) Inventors: John Henry Gallagher, Haverford, PA (US); Roman Bielski, Coopersburg, PA (US); John Newport, Chadds Ford, PA (US); David Joseph Stanley, Woolwich Township, NJ (US)

(73) Assignee: Clean Bite, LLC, Haverford, PA (US)

( * ) Notice: Subject to any disclaimer, the term of this patent is extended or adjusted under 35 U.S.C. 154(b) by 0 days.

(21) Appl. No.: 17/430,297

(22) PCT Filed: Mar. 12, 2020

(86) PCT No.: PCT/US2020/022223
§ 371 (c)(1),
(2) Date: Aug. 11, 2021

(87) PCT Pub. No.: WO2020/168359
PCT Pub. Date: Aug. 20, 2020

(65) Prior Publication Data
US 2022/0087224 A1 Mar. 24, 2022

Related U.S. Application Data

(60) Provisional application No. 62/806,581, filed on Feb. 15, 2019.

(51) Int. Cl.
*A01K 15/02* (2006.01)
*A01K 13/00* (2006.01)
(Continued)

(52) U.S. Cl.
CPC .......... *A01K 15/026* (2013.01); *A01K 13/001* (2013.01); *A46B 1/00* (2013.01);
(Continued)

(58) Field of Classification Search
CPC .... A01K 15/026; A01K 15/02; A01K 13/001; A46B 11/00; A46B 11/0003; A46B 9/04;
(Continued)

(56) References Cited

U.S. PATENT DOCUMENTS

| | | | |
|---|---|---|---|
| 1,946,283 A * | 2/1934 | Hoffman | A46D 1/00 |
| | | | 15/188 |
| 4,022,879 A | 5/1977 | Dietrich | |

(Continued)

FOREIGN PATENT DOCUMENTS

| | | | | |
|---|---|---|---|---|
| CN | 201085237 | * | 7/2008 | ............... A46D 1/00 |
| DE | 3433763 C1 | | 2/1986 | |
| KR | 2020074569 A | * | 6/2020 | ........... A01K 15/026 |

OTHER PUBLICATIONS

Computer generated English translation of DE 69817009, Ness et al., Sep. 2003. (Year: 2003).*

(Continued)

*Primary Examiner* — Laura C Guidotti
(74) *Attorney, Agent, or Firm* — Peter D. Mlynek; Law Offices of Peter D Mlynek

(57) ABSTRACT

The present invention is directed to a dental hygiene appliance, a pad usable in such an appliance, and a method of using such an appliance. The dental hygiene appliance comprises a plurality of mushroom-shaped bristles, wherein the mushroom-shaped bristles comprise a material with Shore 00 hardness between about 50 and about 100. The mushroom-shaped bristles comprise a stipe, a pileus, and optionally a brim. The dental hygiene appliance may be a monolithic body, or comprises a monofacial pad, or bifacial (Continued)

pad, that is held by a dental hygiene appliance frame. The advantage of having a brim is that it offers a larger area for dental hygiene appliance to interact with the tooth surface, and the brim allows the brim to get into crevices of teeth that are too small for pileus to enter. The interstitial space between the mushroom-shaped bristles may also comprise a dentifrice composition.

18 Claims, 4 Drawing Sheets

(51) Int. Cl.
*A46B 1/00* (2006.01)
*A46D 1/00* (2006.01)
*A61D 5/00* (2006.01)

(52) U.S. Cl.
CPC ............ *A46D 1/0253* (2013.01); *A61D 5/00* (2013.01); *A46B 2200/1066* (2013.01); *A46B 2200/1086* (2013.01)

(58) Field of Classification Search
CPC .... A46B 2200/1086; A61D 5/00; A46D 1/02; A46D 1/0253; A46D 1/0269; A46D 1/0284; A46D 1/0207; A44B 18/0065
USPC .......................... 15/167.1, 186–188; D4/136; 119/709–710
See application file for complete search history.

(56) References Cited

U.S. PATENT DOCUMENTS

| | | | |
|---|---|---|---|
| 5,836,033 A | 11/1998 | Berge | |
| 6,044,800 A | 4/2000 | Kubo | |
| 6,415,741 B2* | 7/2002 | Suchowski | A01K 15/026 |
| | | | 119/709 |
| 6,453,501 B1 | 9/2002 | Bella | |
| 6,904,870 B2 | 6/2005 | Russell-Maynard | |
| 7,036,180 B2 | 5/2006 | Hanlon | |
| 8,292,624 B2 | 10/2012 | Gallagher | |
| 8,925,494 B2 | 1/2015 | Pang | |
| 9,603,441 B2 | 3/2017 | Waguespack | |
| 9,737,053 B2 | 8/2017 | Barnvos | |
| 10,863,721 B2* | 12/2020 | Urbanczyk | A01K 15/026 |
| 10,959,579 B1* | 3/2021 | Sotos | A47K 7/02 |
| 2002/0084550 A1 | 7/2002 | Roberts | |
| 2007/0015100 A1* | 1/2007 | Morris | A61D 5/00 |
| | | | 433/1 |
| 2009/0211047 A1* | 8/2009 | Chen | A46D 1/0276 |
| | | | 15/207.2 |
| 2010/0299859 A1 | 12/2010 | Kastl | |
| 2011/0011351 A1 | 1/2011 | Simoni | |
| 2011/0265292 A1* | 11/2011 | Kirby | A44B 18/0096 |
| | | | 24/451 |
| 2015/0223594 A1* | 8/2015 | Ohanessian | A46B 11/0062 |
| | | | 15/104.94 |
| 2017/0290298 A1 | 10/2017 | Barnvos | |
| 2018/0243063 A1* | 8/2018 | Coopersmith | A61D 7/00 |

OTHER PUBLICATIONS

Ponte, Elizabeth, Teknorapex "Shore Hardness and Soft TPEs",Sep. 2017. (Year: 2017).*
Lamberton, Cecil "New toothpaste rids your teeth and gums of dangerous plaque", https://www.cosmeticdentistryofnapa.com/toothpaste-dangerous-plaque/, 2017. (Year: 2017).*
"Livionex Dental Gel" sold on www.amazon.com, https://www.amazon.com/Livionex-Dental-Prevents-Peppermint-Dispensed/dp/B00Y4DSXBM, first available 2015. (Year: 2015).*
Wayback machine (web.archive.org) of "New toothpaste rids your teeth and gums of dangerous plaque", Lamberton, 2017. (Year: 2017).*
OraVet Hygiene Dental Chews for Small Dogs, https://www.chewy.com/oravet-hygiene-dental-chews-small/dp/288605, accessed Jun. 1, 2023. (Year: 2023).*
International Search Report, PCT/US2020/022223, dated Jun. 12, 2020.
Written Opinion of the International Searching Authority, PCT/US2020/022223, dated Jun. 12, 2020.
Extended European Search Report, EP 20755432, dated Dec. 21, 2022.
Cecilia Gorrel, Periodontal Disease and Diet in Domestic Pets, J. Nutr., Nov. 1998, vol. 128, Supplement 11, pp. 2712S-2714S, American Society for Nutrition.
M. Kyllar & K. Witter, Prevalence of dental disorders in pet dogs, Vet. Med.—Czech, Nov. 2005, vol. 50, iss. 11, pp. 496-505, Czech Academy of Agricultral Sciences.
Marta Martinez-Gil et al., Calcium Causes Multimerization of the Large Adhesin LapF . . . , J. Bacteriol., Dec. 2012, vol. 194, iss. 24, pp. 6782-6789, Am. Soc. for Microbiology.
Catherine Buckley et al., The impact of home-prepared diets and home oral hygiene on oral health in cats and dogs, British J. Nutr., 2011, vol. 106, pp. S124-S127, Cambridge.
The Best Dog Toothbrushes of 2022, updated Oct. 4, 2022 https://www.mypetneedsthat.com/best-toothbrushes-for-dogs/.
Amazin.com; CBrosey Mascota Pets Dog Toothbrush, https://www.amazon.com/dp/B01LZA8UHB/ref=sspa_dk_detail_4?psc=1&pd_rd_i=B01LZA8UHB&pd_rd_w=6QGJd&pf_rd_p=21517efd-b385-405b-a405-9a37af61b5b4&pd_rd_wg=zzFF9&pf_rd_r=. . . .
Chewy.com; PRODEN Plaqueoff https://www.chewy.com/proden-plaqueoff-powder-dog-cat/dp/132177?utm_source=google-product&utm_medium=cpc&utm_campaign=f&utm_content=ProDen&utm_term=&gclid=. . . Data website access May 8, 2023.
Amazon.com: Bluestem, Dog Toothbrush and Toothpaste, https://www.amazon.com/dp/B01MSDSS1C?aaxitk=ilvodoilUWrAY-nbuNfu6A&pd_rd_i=B01MSDSS1C&pf_rd_p=3ff6092e-8451-438b-8278-7e94064b4d42&hsa_cr_id=6290785490001&sb-ci-n=. . . Date first available, Feb. 1, 2017.
Examination Report, Indian Patent Appl 202147041494, dated Dec. 30, 2022.

* cited by examiner

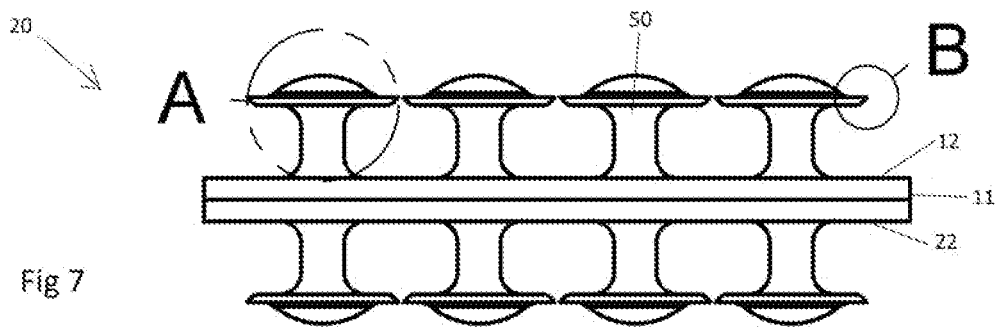
Fig 7
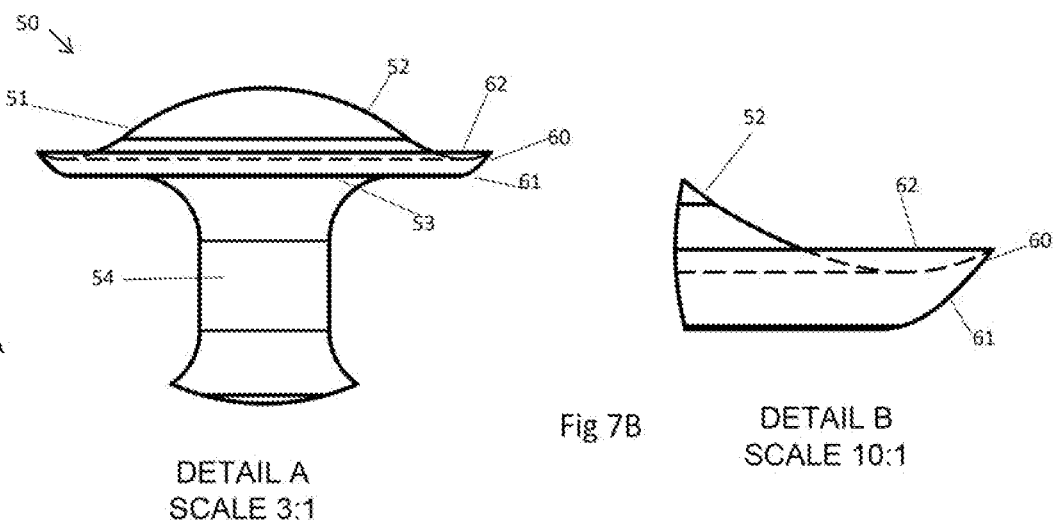
Fig 7A
DETAIL A
SCALE 3:1
Fig 7B
DETAIL B
SCALE 10:1
Fig 8
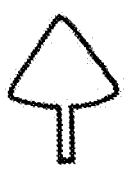 (a)
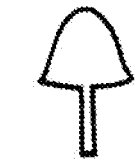 (b)
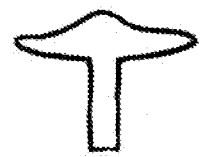 (c)
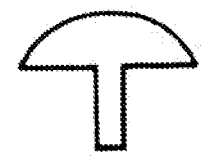 (d)
(e) (f) (g) (h) (i)

ORAL HYGIENE APPLIANCE

CROSS REFERENCE TO RELATED APPLICATION

This application is a national phase application of International Patent Application PCT/US2020/022223, titled "Oral Hygiene Appliance", published as WO2020/168359, and claims the priority of provisional application Ser. No. 62/806,581, filed 15 Feb. 2019; and U.S. application Ser. No. 35/001,796, filed 18 Feb. 2020.

FIELD OF THE INVENTION

The present invention relates to dental hygiene appliances, and methods of cleaning teeth, as related to humans and animals.

BACKGROUND

There are a few options enabling the cleaning of pet's teeth. One option is to utilize a toothbrush similar to the one used by people. Of course, the pet cannot do it, and therefore, brushing has to be performed by the owner. The main difficulty with this approach is that the owner does not feel and does not see the teeth that are being cleaned. Consequently, not all teeth are brushed with equal efficacy. Furthermore, the required pet compliance may be lacking.

Another option is to employ the device similar to the mouthpiece. The device cleans the teeth during chewing. One possibility is that it is made of an edible material that degrades or dissolves in mouth. If the device is not edible and degradable it must be removed after the use.

While there are many different products meant to improve the dental health of animals, most of them are very expensive, inconvenient to use both for the pet and the pet owner, and their effectiveness is often dubious. It is well known that poor dental hygiene of animals can directly lead to diseases such as periodontal disease. The long term effects of poor dental hygiene can result in serious diseases of various internal organs leading eventually to death.

Periodontal disease and diet in domestic pets are discussed in C. Gorrel in *J. Nutr.* 1998, vol. 128, pp 2712S-2714S. Periodontal disease is the most common oral condition seen in domestic pets. In addition to the discomfort caused in the affected animal, there is strong circumstantial evidence to show that a focus of infection in the mouth may cause disease of distant organs. Consequently, prevention of periodontal disease is of paramount importance for the general health and well-being of pets. The presence of plaque on the tooth surfaces is the primary cause of periodontal disease. However, the mechanisms by which disease develops are by no means fully understood. Dietary texture does have an effect on the accumulation of dental deposits and consequently on disease development and progression. Daily toothbrushing remains the single most effective means of removing plaque, thus preventing periodontal disease. On the basis of current knowledge, the best way to maintain healthy periodontal tissues in our pets is frequent toothbrushing. The use of a dental hygiene chew and/or a diet designed to reduce dental deposits can be useful adjunctive measures and should be recommended.

The prevalence of dental disorders in pet dogs is discussed by M. Kyllar and K. Witter in *Vet. Med.—Czech,* 2005, vol. 50, iss. 11: 496-505. Oral disorders of the dog represent for veterinarians a medical challenge and an important field of interest from the economical point of view. Although many epidemiological studies on dental diseases in beagles bred under controlled conditions have been realized, information on frequency of these alterations in populations of pet dogs, especially in Central Europe, is far from complete. The aim of that study was to assess the prevalence of the most common oral diseases in dogs in a Czech urban region. A total number of 408 dogs, presented at a private Czech urban veterinary hospital for different reasons, were analyzed. Site specificity and severity of dental diseases were assessed using modified indexing systems. Dental alterations could be found in 348 out of 408 dogs (85.3%). The most frequent diseases were (i) periodontitis (60.0% of 408 dogs), (ii) calculus (61.3%), (iii) missing teeth (33.8%), and (iv) abnormal attrition (5.9%). Furthermore, single cases of caries, tumors and enamel hypoplasia could be observed. Periodontitis occurred preferentially in the upper jaw of small dogs and increased with age. The labial/buccal side of teeth was affected more severely than the lingual/palatinal side. Differences between left and right side could not be observed. Malocclusion and insufficient oral hygiene care seem to predispose to periodontitis. As periodontitis, dental calculus occurred preferentially in small dogs and increased with age. The prevalence of calculus formation did not differ between left and right side. However, the upper jaw showed a higher degree of affection than the mandible. On the labial/buccal side of the teeth, a thicker calculus layer could be observed than lingually/palatinally. Interestingly, the degree of calculus formation and of periodontitis did not correlate in all cases, supporting the hypothesis that supragingival calculus per se is not an irritant. The pattern of tooth loss was the same between left and right side and between upper and lower jaw. Most commonly, the first premolars were missing followed by incisors and other premolars and molars. Tooth loss for other reasons than periodontitis and single cases of tooth agenesis has not been detected in our study. (Abnormal) tooth wear was detected only in older dogs and affected mostly canines and premolars of large breeds. Age estimation based on dental attrition should be carried out with care, because tooth wear depends on keeping conditions and feeding of the dog. That study confirmed the high prevalence of oral diseases in dogs. Veterinarians could improve the effectiveness of treatment concentrating their diagnostic efforts on age groups and types of teeth at highest risk, as assessed in that and other reports.

Oral hygiene product for animals has been disclosed by U. Dietrich in U.S. Pat. No. 4,022,879. A method and a composition were provided for the care of teeth and the reduction of dental treatment for carnivorous pets, particularly canines. A mildly abrasive, substantially neutral or mildly basic, meat flavored, particularly beef flavored, dentrifice is employed. The dentrifice is found to be acceptable to the animal, causes no harmful effects on ingestion, and greatly reduces the need of a veterinarian's scaling of the pet's teeth.

Dental care article for pets and process for producing the same are disclosed in U.S. Pat. No. 6,044,800. There was provided an edible dental care article, that is so palatable to the taste of pets, clears residual food in the pet's mouth while chewed by a pet, thereby not only preventing adhesion of plaque and formation of dental calculus but giving a massage to the pet's gum. The edible dental care article for pets was characterized in that a casing material is processed in a thread-like manner, a string-like manner, or a thin-tube-like manner; one of the casing material or a combination of the casing material of several kinds, preferably combined with thread-like other proteins, carbohydrates or lipids, is twisted in a string-like manner; cord-like members are tied into a bundle or twisted together so as to make a rope-like member of a prescribed shape in conformity with the kind or size of a pet, with the twists of the rope-like member being treated so as not to loosen.

An animal toothbrush was disclosed in U.S. Pat. No. 6,453,501. A toothbrush for pets and animals, which easily conforms to compound and complex shapes of an animal's teeth, and which cleans substantially all surfaces of an animal's tooth at the same time, during brushing. The toothbrush is capable of being used with minimum visibility of the animal's teeth, as the animal may not always be cooperative during the teeth brushing process. The toothbrush is durable, long lasting, easy to manufacture, light weight, inexpensive, safe to use, attractive, sturdy, and of simple construction.

A toothbrush with four bristle groups is disclosed in U.S. Pat. No. 7,036,180. A toothbrush for use on domestic pets, comprising a toothbrush head with each end curved upward at roughly 30 degree angles, and four sets of soft bristles attached to the head. Three sets of bristles are attached to the front face of the brush head, with two sets positioned opposite each other on each upward curved end of the head and the third set of bristles positioned in the center in the middle region, perpendicular to the toothbrush head between the other two sets, thereby providing coverage of the mesial, distal and occlusal surfaces of the teeth simultaneously. The fourth set of bristles is attached to the back side of the toothbrush head, thereby propping open the jaw and softening the bite while cleaning and massaging the opposing teeth at the same time that the other three sets of bristles are doing the primary cleaning. The toothbrush handle is attached to the center of the head for ease of use and the ability to reach the back molars.

Products and methods for improving animal dental hygiene is taught in U.S. Pat. No. 6,904,870. Products and methods for reducing tartar on the teeth of a pet were provided. In an embodiment, a chewable product that enhances dental hygiene in a pet is provided comprising a body having a continuous phase and a discontinuous phase in such a proportion so that the force required to penetrate the product is greater than an anticipated bite force exerted by the pet during a normal biting event, and below the maximum force that the pet may periodically exert.

An oral appliance is described by J. H. Gallagher and Roman Bielski in U.S. Pat. No. 8,292,624. An oral appliance with opposite channels for receiving the upper and lower dental arches is made from an edible material, in particular a gel. The appliance is integrally molded with protrusions that act as brush bristles to clean the teeth and stimulate the gums when manipulated in a chewing motion. The gel composition is water soluble and degrades in saliva. After chewing on the appliance for a time to clean the teeth, the product becomes masticated, broken up and ingested. The appliance can incorporate a breath freshener or an active dental composition, or can be flavored or can incorporate a food supplement or pharmaceutical, in which case the appliance is intended to be chewed up and eaten after serving its tooth cleaning function. Dentifrice reservoirs, air passageways and lateral braces for manipulation by the tongue can be provided.

Calcium causes multimerization of the large adhesin LapF and modulates biofilm formation by *Pseudomonas putida*, as has been discussed in *J. Bacteriol.* 2012; vol. 194, iss. 24, p 6782-9. LapF is a large secreted protein involved in microcolony formation and biofilm maturation in *Pseudomonas putida*. Its C-terminal domain shows the characteristics of proteins secreted through a type I secretion system and includes a predicted calcium binding motif. We provide experimental evidence of specific binding of Ca(2+) to the purified C-terminal domain of LapF (CLapF). Calcium promotes the formation of large aggregates, which disappear in the presence of the calcium chelator EGTA. Immunolocalization of LapF also shows the tendency of this protein to accumulate in vivo in certain extracellular regions. These findings, along with results showing that calcium influences biofilm formation, lead us to propose a model in which *P. putida* cells interact with each other via LapF in a calcium-dependent manner during the development of biofilms.

Methods for making appetizing and dentally efficacious animal chews are described in U.S. Pat. No. 9,737,053. Described therein are chewable articles intended to be provided to animals for purposes including dental cleaning, breath freshening, nutrition, administration to the animal of beneficial agents, satisfaction of the animal's urge to chew, and general enjoyment by the animal. Also disclosed are apparatus and methods for making such chewable articles, the methods including the use of a processing aid to lubricate the article-forming apparatus, such as extruders, portioners, and molds, and to reduce the power requirements of such apparatus in the forming process.

Although many advances in the art of cleaning pet's teeth have been made, many more challenges remain.

SUMMARY OF THE INVENTION

The present invention is directed to a dental hygiene appliance, a pad usable in such an appliance, and a method of using such an appliance. Under one embodiment, the present invention is directed to a dental hygiene appliance 70 comprising a surface 72, and a plurality of mushroom-shaped bristles 50 extending from the surface, wherein the mushroom-shaped bristles comprise a material with Shore 00 hardness between about 50 and about 100.

Under one embodiment, the dental hygiene appliance is a monolithic body, meaning that the composition of the entire dental hygiene appliance, including the mushroom-shaped bristle, and any other parts of the dental hygiene appliance, such as a handle, are composed of a single material of uniform composition. Such a monolithic dental hygiene appliance may be formed by rapid injection molding or a similar type of method of forming a monolithic body. This is exemplified by FIG. 10.

Under one embodiment, the dental hygiene appliance is an animal toy that can be used by an animal to chew on. Such chewing can be done on a daily basis or on semi-regular basis or on occasional basis.

Under an alternative embodiment, as exemplified by a FIG. 9, the dental hygiene appliance comprises a monofacial pad 10, or bifacial pad 20, that is held by a dental hygiene appliance frame 71. The monofacial pad 10 or bifacial pad 20 is attached reversibly to the dental hygiene appliance frame 71 by any suitable means. Under one embodiment, the monofacial pad 10 or bifacial pad 20 is attached reversibly to the dental hygiene appliance frame 71 by pegs or screws that protrude through the small orifices 75 in the monofacial pad 10 or bifacial pad 20.

The monofacial pad is exemplified by FIG. 1 to FIG. 3. The pad 10 is a flexible and reversibly deformable material that is used in a dental hygiene appliance that is made to accept such pads. The pad 10 comprises a pad base 11 and a mushroom-shaped bristle. The phrase "monofacial pad" means a pad on which the mushroom-shaped bristles are located only on one face of the pad. Under one embodiment, the present invention is directed to a bifacial pad for use in an oral care appliance comprising: a top surface; a bottom surface; and a plurality of mushroom-shaped bristles extending from the top surface and the bottom surface, wherein the mushroom-shaped bristles comprise a material with Shore 00 hardness between about 50 and about 100. The bifacial pad is exemplified by FIG. 4 and FIG. 5. The pad 20 is a flexible and reversibly deformable material which is used in an dental hygiene appliance that is made to accept such pads. The pad 20 comprises a pad base 11 and a mushroom-shaped bristle.

The pad base 11 may be of any shape, as long as it is usable in a dental hygiene appliance which is suitable for cleaning teeth. The pad also has a top surface 12. The top surface is orthogonal to the short side, or the smaller dimension, of the base of the pad. The pad base 11 in FIGS. 1 to 3 is illustrated as having top surface that is rectangular in shape. However, the top surface can be any shape that is suitable for use as being used in a dental hygiene appliance.

The dental hygiene appliance, or the monofacial pad, or the bifacial pad of the present invention comprises mushroom-shaped bristles extending from the top surface, and optionally, from the bottom surface. The term "bristle" as used herein, means any protrusion from the body of a dental hygiene appliance, which when in contact against a patient's tooth, or when rubbed against the tooth, with or without dentifrice, helps to clean the tooth or reduce bacterial growth. The phrase "mushroom-shaped bristle" means that the bristle has a shape that roughly resembles a prototypical mycological mushroom. Each of the mushroom-shaped bristles comprises at least a pileus and a stipe.

The term "pileus" corresponds roughly to the cap-like portion of the mushroom. The pileus is approximately circular in the same plane as the top surface. Under one embodiment, the pileus has approximately a circular projection. An example of the projection of pileus is illustrated in FIG. 2 or 8. Under an alternative embodiment, the pileus has approximately a square projection. Under another alternative embodiment, the pileus has approximately a Reuleaux square projection. Under still another alternative embodiment, the pileus has approximately a regular hexagonal projection or approximately a Reuleaux hexagonal projection.

The space between the mushroom-shaped bristles is an interstitial space 80 between mushroom-shaped bristle 50.

The profile of the pileus may be varied depending on the animal, teeth, and hardness of the material, but is generally selected so that either the top of the pileus or the bottom of the pileus contacts well with the surface of the teeth of the animal.

As illustrated in FIG. 9, the pileus has any number of possible shapes. Such shapes include a convex shape, a conical shape, an ovate shape, a flat shape, a plane shape, a campanulate shape, a bell shape, a depressed shape, an infundibuliform shape, an umbonate shape, an umbilicate shape, and like.

During the process of forming the pad or the dental hygiene appliance or any other article of manufacture, that comprise the mushroom-shaped bristles, the uneven cooling or post-mold expansion or contraction of the material that is above the stipe may cause the pileus to have either a depression or a bump in a portion of the pileus.

Each of the mushroom-shaped bristles comprises at least a pileus and a stipe. The stipe is a column that connects the pileus from the pad base. The stipe may have any shape that allows the pileus to be connected with the pad base. Under one embodiment, the stipe is flexible enough to be reversibly deformed by biting or masticating of the mushroom-shaped bristle Under one embodiment, the stipe has a cylindrical shape. Under one embodiment, the stipe has a right cylindrical shape. Under one embodiment, the stipe has an oblique cylindrical shape. The oblique cylindrical shape may be offset from the perpendicular at any angle between 0° and about 50°.

The stipe may have any profile suitable for the use of cleaning teeth. Under one embodiment, the projection of the stipe is selected from the group consisting of a polygon, a circle, an oval, an ovoid, a circular segment, a crescent, a lens, a vesica piscis, a lune, a quatrefoil, a Reuleaux polygon, a Reuleaux triangle, a semicircle, a heart, and like.

The present invention is also directed to a pad or a dental hygiene appliance that comprises mushroom-shaped bristles, wherein at least one of the mushroom-shaped bristles 50 comprises a pileus 51 and a stipe 54, wherein the pileus further comprises a brim 60.

The brim 60 is a thin extension of the pileus away from the center of the pileus, roughly orthogonal to the stipe or parallel to the pad surface. The brim 60, under one embodiment, surrounds the entire pileus, to provide a 360° coverage. Examples of mushroom-shaped bristles with a 360° brim are illustrated in FIGS. 7 to 11. The brim may extend out from the pileus out in a flat plane that is parallel to the pad top surface, or the brim extends from the pileus in a way that it appears that it droops down, or the brim extends from the pileus in a way that it appears that it is turned up, so that the outer edge of the brim is further from the pad base than the part of the brim that closer to the stipe.

The present invention is also directed to a pad or a dental hygiene appliance, wherein the brim 60 comprises an underbrim surface 61, and an overbrim surface 62, wherein biting of the pad or the dental hygiene appliance by a patient provides a rubbing action of the underbrim or overbrim with the patient's teeth.

One of the advantages of having a brim is that it offers a larger area for dental hygiene appliance to interact with the tooth surface. Another advantage of having a brim is that the thinness of the brim allows the brim to get into crevices of teeth that are too small for pileus to enter. Yet another advantage of having a brim is that the thinness of the brim allows the flexibility to let a greater area of the mushroom-shaped bristles be in contact with the tooth.

The pad comprises a plurality of mushroom-shaped bristles extending from the top surface. The plurality means more than 1. The number of mushroom-shaped bristles on the pad or on the dental hygiene appliance may be more than 10 or more than 100 or more than 1000.

The dental hygiene appliance, pad, mushroom-shaped bristle, and other parts of the dental hygiene appliance, are of the size and dimensions that are suitable for use as dental hygiene appliance. The mean diameter of the dental hygiene appliance measures from 5 cm to 30 cm. The height of each of the mushroom-shaped bristles ranges from about 5 mm to about 20 mm. The diameter of the pileus ranges from 5 mm to 30 mm. The ratio of the mean diameter of the pileus to the mean diameter of the stipe is between about 3:1 to about 20:1.

The present invention is directed to a dental hygiene appliance or to a monofacial or a bifacial pad for use in dental hygiene appliance, comprising a plurality the mushroom-shaped bristles, wherein the mushroom-shaped bristles comprise a material with Shore 00 hardness between about 50 and about 100. The mushroom-shaped bristles comprise a material with Shore 00 hardness between about 50 and about 100.

Under one embodiment, dental hygiene appliance, the monofacial pad, or bifacial pad of the present invention is made of a material that comprises a polymer selected from the group consisting of polyalkenes, polyisoprene, polybutadiene, poly(alkyl acrylate and methacrylate), polyvinyl alcohol, polystyrene, styrene butadiene, polyesters, polyethylene terephthalate, polyamide, polyurea, polycarbonate, copolymers thereof, and mixtures thereof.

The dental hygiene appliance or the pad is prepared by a suitable method to result in a well-formed, well-defined dental hygiene appliance comprising mushroom-shaped bristles. Exemplary methods of producing the dental hygiene appliance or the pad associated therewith include blow molding, rotational molding, injection molding, reaction injection molding, structural reaction injection molding, and like.

Under one embodiment, the present invention is directed to a dental hygiene appliance, monofacial pad, or a bifacial pad, comprising mushroom-shaped bristles 50, wherein an interstitial space 80 between the mushroom-shaped bristles comprises a dentifrice composition 81 comprising an aqueous gel prepared from the group consisting of oligosaccharide, polysaccharide, starch, cellulose, sodium carboxymethyl cellulose, sodium alginate, polylactic acid, polygluconic acid, copolymers thereof, and mixtures thereof.

The dentifrice is on sufficient high viscosity or hardness that it does not flow out of the interstitial space 80. Under one embodiment, the dentifrice is a gel that the animal's owner or trainer places into the interstitial space 80. Under one embodiment, the dental hygiene appliance or the pad is purchased by the animal's owner or trainer with the dentifrice already preloaded on the pad or dental hygiene appliance.

Under one embodiment, the dentifrice comprises activated edathamil. The activation of an FDA-approved, food-safe chelator, edathamil, allows the edathamil to penetrate into a biofilm and reduce the calcium levels in the plaque fluid. The activated edathamil, in the form of a dentifrice, is thought to strategically disrupt the calcium levels in the biofilm, resulting in a dramatic reduction in plaque.

The dentifrice may be formed by adding the aqueous solution of an appropriate salt such as, but not limited to, calcium gluconate, calcium lactate, calcium acetate, magnesium sulfate, alum, aluminum sulfate and the like, with stirring, to an aqueous solution of the gel-forming polymer. At a given polymer concentration, the viscosity of polymer solutions increases with the polymer molecular weight. Because higher polymer concentrations provide more rigid gel structures, Under one embodiment, lower molecular weight polymers are used. Lower viscosities facilitate the mixing of the polymer solution with the ionic salt solution. This is particularly important as, in some instances, gel formation can be very rapid, preventing the formation of a uniform gel or providing insufficient open time for molding. In such instances, gel formation can be slowed down by the use of a complexing or chelating agent such as sodium citrate.

Under one embodiment, the dentifrice composition degrades upon exposure to saliva. The dentifrice delivers the compounds which are useful for cleaning the teeth. The dentifrice under one embodiment further comprises an abrasive selected from the group consisting of silica, calcium carbonate, calcium phosphates, and mixtures thereof.

Under one embodiment, the silica functions as an abrasive agent. Under another embodiment, the silica functions as a thickening agent. Under still another embodiment, the oral care composition comprises both an abrasive silica and a thickening silica.

Under one embodiment, the dentifrice further comprises an active oral health agent selected from the group consisting of a vitamin, ascorbic acid, flavonoid, flavanol, flavones, procyanidins, flavoring and mixtures thereof.

The present invention is also directed to a method for reducing bacterial growth, cleaning teeth, removing dental plaque, reducing dental erosion, treating gingivitis, or reducing tooth decay in an oral cavity of a patient, comprising contacting teeth of a patient with the dental hygiene appliance. The method includes contacting teeth of the patient with the dental hygiene appliance.

The mushroom-shaped bristle scrapes the teeth to break the biofilm, or to deliver the dentifrice to the teeth, or any part of the teeth. The mushroom-shaped bristle deforms to accommodate the teeth. The deformation, under one embodiment, is reversible, meaning that the tooth pushes the mushroom-shaped bristles to deform, and after the teeth are dissociated from the dental hygiene appliance, the mushroom-shaped bristle pops back up into their original shape.

There are several deformations that are characteristic of the use of the dental hygiene appliance, including the deformation of the pad base 11, the bend of the stipe with respect to the base pad top surface of the base pad bottom surface, the bend of the stipe with respect to the pileus, the bending or twisting of the stipe, the deformation of the pileus 51, and the deformation of the brim 60.

The present invention is also directed to the method for reducing bacterial growth, cleaning teeth, removing dental plaque, reducing dental erosion, treating gingivitis, or reducing tooth decay in an oral cavity of a patient, comprising contacting teeth of a patient with the dental hygiene appliance, wherein the patient is a mammal, such as a human, a companion animal, or a farm animal.

Experiments have resulted in reaching the following conclusion. Firstly, calcium cation crosslinks alginate units to form a stable gel. Addition of sodium citrate solution slows down the process. Secondly, carboxymethylcellulose can be crosslinked with aluminum ions. Calcium ions seem to be much less effective. A mixture of both polymers can be crosslinked to form a useful product. Aluminum ions can be used to crosslinked alginate units.

In the first aspect, the invention relates to a monofacial pad (10) for use in a dental hygiene appliance comprising: a pad base (11) comprising a pad base top surface (12); and a plurality of mushroom-shaped bristles (50) extending from the top surface (12), wherein the mushroom-shaped bristles (50) comprise a material with Shore 00 hardness between about 50 and about 100.

In the second aspect, the invention relates to a bifacial pad (20) for use in a dental hygiene appliance comprising: a pad base (11) comprising a pad base top surface (12) and pad base bottom surface (22); and a plurality of mushroom-shaped bristles (50) extending from the pad base top surface (12) and the pad base bottom surface (22), wherein the mushroom-shaped bristles comprise a material with Shore 00 hardness between about 50 and about 100.

In the third aspect, the invention relates to a pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100, wherein at least one of the mushroom-shaped bristles comprises a pileus (51) and a stipe (52), wherein the pileus comprises a brim (60).

In the fourth aspect, the invention relates to a pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100, wherein at least one of the mushroom-shaped bristles comprises a pileus (51) and a stipe (52), wherein the pileus comprises a brim (60), wherein the brim (60) comprises an underbrim surface (61), and an overbrim surface (62), wherein biting of the pad by a patient provides a rubbing action of the underbrim surface or overbrim surface with the patient's teeth.

In the fifth aspect, the invention relates to a pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100, wherein the material comprises polymer selected from the group consisting of polyalkenes, polyisoprene, polybutadiene, poly(alkyl acrylate and methacrylate), polyvinyl alcohol, polystyrene, styrene butadiene, polyesters, polyethylene terephthalate, polyamide, polyurea, polycarbonate, copolymers thereof, and mixtures thereof.

In the sixth aspect, the invention relates to a dental hygiene appliance comprising the pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100, In the seventh aspect, the invention relates to a dental hygiene appliance (70) comprising a surface (72), and a plurality of mushroom-shaped bristles (50) extending from the surface, wherein the mushroom-shaped bristles comprise a material with Shore 00 hardness between about 50 and about 100.

In the eighth aspect, the invention relates to a dental hygiene appliance (70) comprising a surface (72), and a plurality of mushroom-shaped bristles (50) extending from the surface, wherein the mushroom-shaped bristles comprise a material with Shore 00 hardness between about 50 and about 100, wherein at least one of the mushroom-shaped bristles (50) comprises a pileus (51) and a stipe (54), wherein the pileus comprises a brim (60).

In the eighth aspect, the invention relates to a dental hygiene appliance (70) comprising a surface (72), and a plurality of mushroom-shaped bristles (50) extending from the surface, wherein the mushroom-shaped bristles comprise a material with Shore 00 hardness between about 50 and about 100, wherein at least one of the mushroom-shaped bristles (50) comprises a pileus (51) and a stipe (54), wherein the pileus comprises a brim (60), wherein the brim (60) comprises an underbrim surface (61), and an overbrim surface (62), wherein biting of the pad by a patient provides a rubbing action of the underbrim or overbrim with the patient's teeth.

In the tenth aspect, the invention relates to a dental hygiene appliance (70) comprising a surface (72), and a plurality of mushroom-shaped bristles (50) extending from the surface, wherein the mushroom-shaped bristles comprise a material with Shore 00 hardness between about 50 and about 100, wherein the material comprises polymer selected from the group consisting of polyalkenes, polyisoprene, polybutadiene, poly(alkyl acrylate and methacrylate), polyvinyl alcohol, polystyrene, styrene butadiene, polyesters, polyethylene terephthalate, polyamide, polyurea, polycarbonate, copolymers thereof, and mixtures thereof.

In the eleventh aspect, the invention relates to a dental hygiene appliance (70) comprising a surface (72), and a plurality of mushroom-shaped bristles (50) extending from the surface, wherein the mushroom-shaped bristles comprise a material with Shore 00 hardness between about 50 and about 100, or a pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100, wherein an interstitial space (80) between the mushroom-shaped bristles (50) comprises a dentifrice composition comprising an aqueous gel prepared from the group consisting of oligosaccharide, polysaccharide, starch, cellulose, sodium carboxymethyl cellulose, sodium alginate, polylactic acid, polygluconic acid, copolymers thereof, and mixtures thereof.

In the twelveth aspect, the invention relates to a dental hygiene appliance (70) comprising a surface (72), and a plurality of mushroom-shaped bristles (50) extending from the surface, wherein the mushroom-shaped bristles comprise a material with Shore 00 hardness between about 50 and about 100, or a pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100, wherein an interstitial space (80) between the mushroom-shaped bristles (50) comprises a dentifrice composition comprising an aqueous gel prepared from the group consisting of oligosaccharide, polysaccharide, starch, cellulose, sodium carboxymethyl cellulose, sodium alginate, polylactic acid, polygluconic acid, copolymers thereof, and mixtures thereof, wherein the aqueous gel is prepared from the group consisting of sodium carboxymethyl cellulose, sodium alginate, polylactic acid, polygluconic acid, copolymers thereof, and mixtures thereof, wherein the sodium carboxymethyl cellulose, sodium alginate, polylactic acid, polygluconic acid, copolymers thereof, and mixtures thereof are crosslinked via the addition of species that liberate divalent, trivalent or polyvalent ions.

In the thirteenth aspect, the invention relates to a dental hygiene appliance (70) comprising a surface (72), and a plurality of mushroom-shaped bristles (50) extending from the surface, wherein the mushroom-shaped bristles comprise a material with Shore 00 hardness between about 50 and about 100, or a pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100, wherein an interstitial space (80) between the mushroom-shaped bristles (50) comprises a dentifrice composition comprising a gelatin cross-linked with cross-linking agents selected from the group consisting of polyethylene glycol, polypropylene glycol, glycerol, polyols, polyvinyl alcohol, diamine, triamine, polyamines and mixtures thereof.

In the fourteenth aspect, the invention relates to a dental hygiene appliance (70) comprising a surface (72), and a plurality of mushroom-shaped bristles (50) extending from the surface, wherein the mushroom-shaped bristles comprise a material with Shore 00 hardness between about 50 and about 100, or a pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100, wherein the dentifrice composition degrades upon exposure to saliva.

In the fifteenth aspect, the invention relates to a dental hygiene appliance (70) comprising a surface (72), and a plurality of mushroom-shaped bristles (50) extending from the surface, wherein the mushroom-shaped bristles comprise a material with Shore 00 hardness between about 50 and about 100, or a pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100, wherein an interstitial space (80) between the mushroom-shaped bristles (50) comprises a dentifrice composition comprising an aqueous gel prepared from the group consisting of oligosaccharide, polysaccharide, starch, cellulose, sodium carboxymethyl cellulose, sodium alginate, polylactic acid, polygluconic acid, copolymers thereof, and mixtures thereof, wherein the dentifrice further comprises an abrasive selected from the group consisting of silica, calcium carbonate, calcium phosphates, and mixtures thereof.

In the sixteenth aspect, the invention relates to a dental hygiene appliance (70) comprising a surface (72), and a plurality of mushroom-shaped bristles (50) extending from the surface, wherein the mushroom-shaped bristles comprise a material with Shore 00 hardness between about 50 and about 100, or a pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100, wherein an interstitial space (80) between the mushroom-shaped bristles (50) comprises a dentifrice composition comprising an aqueous gel prepared from the group consisting of oligosaccharide, polysaccharide, starch, cellulose, sodium carboxymethyl cellulose, sodium alginate, polylactic acid, polygluconic acid, copolymers thereof, and mixtures thereof, wherein the dentifrice further comprises an active oral health agent selected from the group consisting of a vitamin, ascorbic acid, flavonoid, flavanol, flavones, procyanidins, flavoring and mixtures thereof.

In the seventeenth aspect, the invention relates to a dental hygiene appliance (70) comprising a surface (72), and a plurality of mushroom-shaped bristles (50) extending from the surface, wherein the mushroom-shaped bristles comprise a material with Shore 00 hardness between about 50 and about 100, or a pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100, wherein an interstitial space (80) between the mushroom-shaped bristles (50) comprises a dentifrice composition comprising an aqueous gel prepared from the group consisting of oligosaccharide, polysaccharide, starch, cellulose, sodium carboxymethyl cellulose, sodium alginate, polylactic acid, polygluconic acid, copolymers thereof, and mixtures thereof, wherein the dentifrice further comprises activated edathamil.

In the eighteenth aspect, the invention relates to a dental hygiene appliance comprising the pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100; or a dental hygiene appliance (70) comprising a surface (72), and a plurality of mushroom-shaped bristles (50) extending from the surface, wherein the mushroom-shaped bristles comprise a material with Shore 00 hardness between about 50 and about 100; wherein the dental hygiene appliance is an animal toy, a chew toy, or a tug-of-war toy.

In the nineteenth aspect, the invention relates to a method for reducing bacterial growth, cleaning teeth, removing dental plaque, reducing dental erosion, treating gingivitis, or reducing tooth decay in an oral cavity of a patient, comprising contacting teeth of a patient with the dental hygiene appliance comprising the pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100; or with a dental hygiene appliance (70) comprising a surface (72), and a plurality of mushroom-shaped bristles (50) extending from the surface, wherein the mushroom-shaped bristles comprise a material with Shore 00 hardness between about 50 and about 100.

In the twentieth aspect, the invention relates to a method for reducing bacterial growth, cleaning teeth, removing dental plaque, reducing dental erosion, treating gingivitis, or reducing tooth decay in an oral cavity of a patient, comprising contacting teeth of a patient with the dental hygiene appliance comprising the pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100; or with a dental hygiene appliance (70) comprising a surface (72), and a plurality of mushroom-shaped bristles (50) extending from the surface, wherein the mushroom-shaped bristles comprise a material with Shore 00 hardness between about 50 and about 100; wherein the patient is a vertebrate.

In the twenty-first aspect, the invention relates to a method for reducing bacterial growth, cleaning teeth, removing dental plaque, reducing dental erosion, treating gingivitis, or reducing tooth decay in an oral cavity of a patient, comprising contacting teeth of a patient with the dental hygiene appliance comprising the pad for use in a dental hygiene appliance comprising: a pad base comprising a pad base surface and a plurality of mushroom-shaped bristles (50) extending from the pad base surface, wherein the mushroom-shaped bristles comprise a material with Shore 00 hardness between about 50 and about 100; or with a dental hygiene appliance (70) comprising a surface (72), and a plurality of mushroom-shaped bristles (50) extending from the surface, wherein the mushroom-shaped bristles comprise a material with Shore 00 hardness between about 50 and about 100; wherein the patient is a mammal that is a human, a companion animal, and a farm animal.

BRIEF DESCRIPTION OF THE DRAWINGS

FIG. 7 is an elevation view of a bifacial pad comprising a pad base of mushroom-shaped bristles wherein a pileus comprises a brim.

FIG. 7A is a close up of a single mushroom-shaped bristle comprising a pileus that comprises a brim.

FIG. 8 are illustrations of various shapes of mushroom-shaped bristles.

DETAILED DESCRIPTION OF THE INVENTION

Figure 1:
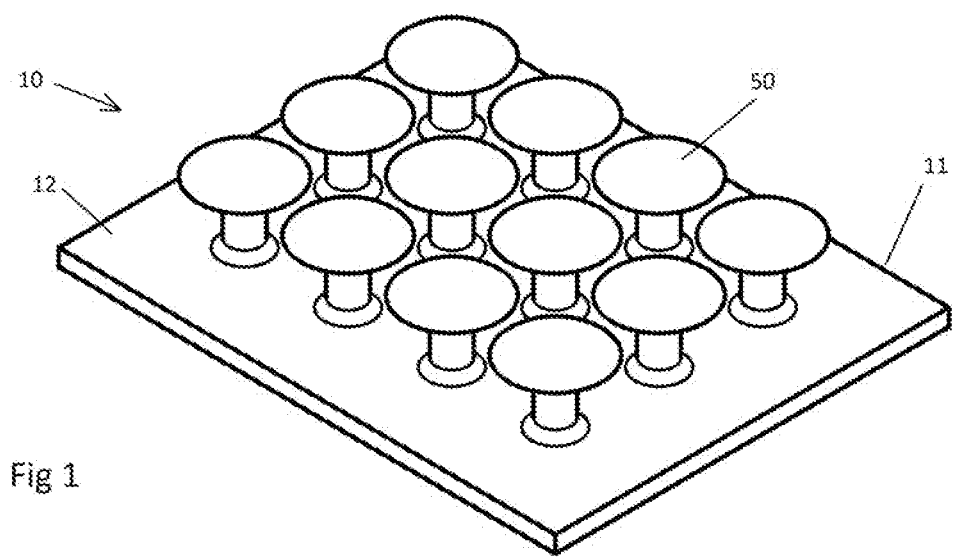
FIG. 1 is a perspective view of a monofacial pad comprising a pad base of mushroom-shaped bristles

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation.

As used herein and in the appended claims, the singular forms "a", "an", and "the" include plural references unless the context dictates otherwise. The singular form of any class of the ingredients refers not only to one chemical species within that class but also to a mixture of those chemical species; for example, the term "flavonoid" in the singular form, may refer to a mixture of compounds each of which is also considered a flavonoid. The terms "a" (or "an"), "one or more" and "at least one" may be used interchangeably herein. The terms "comprising", "including", and "having" may be used interchangeably. The term "include" should be interpreted as "include, but are not limited to". The term "including" should be interpreted as "including, but are not limited to".

The abbreviations and symbols as used herein, unless indicated otherwise, take their ordinary meaning. The abbreviations "vol." means "volume", "iss." means "issue", "pp" means pages.

For some words, symbols, or terms used herein should contain a subscript or a superscript, for readability purposes or typesetting purposes, the subscript or superscript portion of the word, symbol, or term, has been typeset not offset or not in reduced size. Examples of such words, symbols, or terms include chemical formulas, ion charges, Schoenflies point group symmetry notations, and like.

The symbol "°" refers to a degree, including a degree of an angle and degree of Celsius. The term "about" when referring to a number means any number within a range of 10% of the number. For example, the phrase "about 50" refers to a number between and including 45.000 wt % and 55.000 wt %.

As used throughout, ranges are used as shorthand for describing each and every value that is within the range. Any value within the range can be selected as the terminus of the range. Thus, the phrase such as "greater than about 35 wt %" includes the value of 35 wt %.

Any member in a list of species that are used to exemplify or define a genus may be mutually different from, or overlapping with, or a subset of, or equivalent to, or nearly the same as, or identical to, any other member of the list of species. Further, unless explicitly stated, such as when reciting a Markush group, the list of species that define or exemplify the genus is open, and it is given that other species may exist that define or exemplify the genus just as well as, or better than, any other species listed.

All references cited herein are hereby incorporated by reference in their entireties. In the event of a conflict in a definition in the present disclosure and that of a cited reference, the present disclosure controls.

A veterinary oral appliance comprising two different material compositions, that when used in combination, enable the cleaning of the exposed tooth surfaces of domesticated pets, particularly dogs and cats, and larger farm animals. The strength characteristics of each material, such as compression, tear, tinsel, and elongation, individually show significant variations. In the appliance's finished form, the materials are segregated and interfaced in such a manner to accomplish the brushing of the enamel of the exposed tooth's surface when chewed, which is typical throughout the product line. The synthetic polymer provides the structural integrity of the comprised unit (in all product variations) and additionally, is used through the design of a ramphoid cusp (derived from the Greek word ραμφoζ, meaning "bird beak" or "beaklike") formed to be inverted and makeup the circumference edge of the dome-shaped cap attached to a generic stem geometry (depicted as a tapered column) to enhance the mechanical brushing of the tooth's exposed surface and adjacent gingival margin. The synthetic polymer is made of a biodegradable material. The gelatin is a softer, more penetrable material that serves as a carrier for a host of possible additives, and all, e.g., dentifrice, flavoring, vitamins, therapeutics, and medications. This gelatin material in its finished state is a foodstuff and will dissolve slowly through the utility period. As a foodstuff, it can be fully ingested without any secondary effects on the animal. Further, inherent to the gelatin or collagen, there is a protein concentration that will vary depending on the size of the appliance, which is governed by the animal's bite structure and its overall size measured by weight.

The present device consists of two parts. One of the parts (part A) is made of a polymeric material that is not degradable in the mouth. It gives the device the necessary strength and keeps the shape. The other part (part B) is made of a softer penetrable material that occupies the space left void in the formation of the supportive substrate comprised of part A, and enables the animal's teeth to be completely immersed while being brushed mechanically with the dome-shaped cap and generic stem as part of the substrate structure. As the animal continues to masticate, part B degrades or dissolves in its mouth during the utility period while simultaneously acting to clean the animal's teeth. Concluding the utility period, most of the part B component will have dissolved and been ingested, leaving the formed substrate made of part A to be removed from the animal's mouth and disposed of by the owner, permitting it to decompose in an eco-friendly manner.

The polymers that can act as the part A must fulfill several requirements. Here are the most obvious: safety, material approval by ADA, biodegradability, low cost (it is disposable), compatibility with material of part B, no taste or smell, ability to introduce a handle if needed, etc.

The entries in the list of specific polymers that part A is composed of are meant to serve as examples and not to limit the possible polymers that may be used in the invention: polyalkenes such as polyethylene, polypropylene and ethylene-propylene copolymers, polyisoprene, polybutadiene, poly(alkyl acrylate and methacrylate), polyvinyl alcohol, polystyrene and derivatives such as styrene butadiene polymers, polyesters such as polyethylene terephthalate and its furan equivalent (2,4-furandicarboxylate esters), polyamides, polyureas, polycarbonates, non-degradable natural macromolecules belonging to polysaccharides, proteins, and the like.

Because some of these polymers are not biodegradable they will have to contain biodegradable units incorporated into the main body of the polymer. Part A may be additionally connected to a handle or other unit facilitating both the brushing if needed and the removal of part A after most or all of part B had been utilized.

Part B is made of a material that disintegrates in the mouth during chewing or brushing. It may either dissolve in saliva or degrade in the presence of the saliva enzymes such as amylase. The list of polymers that part B can be composed of includes but is not limited to: gelatin and partially cross-linked gelatin with such mild (hydrogen bond forming) cross-linking agents as polyethylene glycol, polypropylene glycol, glycerol and other polyols, PVA, and di-, tri- and polyamines, chitosan, substituted starches and other polysaccharides such as guar, xanthan gum, carrageenan, gum arabic, substituted celluloses, and the like.

Part B may additionally contain components helping with brushing such as abrasive agents. Additionally, since part B components end up in the intestinal system, it may comprise vitamins such as ascorbic acid, nutrients, vaccines, medicinal compounds (therapeutics), and other biologically active compounds such as flavonoids including flavanols, flavones and procyanidins, flavorings and other agents not involved in the dental hygiene of an animal but helping its general health. These agents may be uniformly distributed throughout part B of the device or be located in special reservoirs or containers. If their taste is unpleasant, the additional components may be micro or nano-encapsulated. In such a case, the outer shell of the capsules must degrade in the gastrointestinal system (in stomach or intestines).

The present invention is directed to a dental hygiene appliance, a pad usable in such an appliance, and a method of using such an appliance.

Under one embodiment, the present invention is directed to a dental hygiene appliance 70 comprising a surface 72, and a plurality of mushroom-shaped bristles 50 extending from the surface, wherein the mushroom-shaped bristles comprise a material with Shore 00 hardness between about 50 and about 100.

Figure 10:
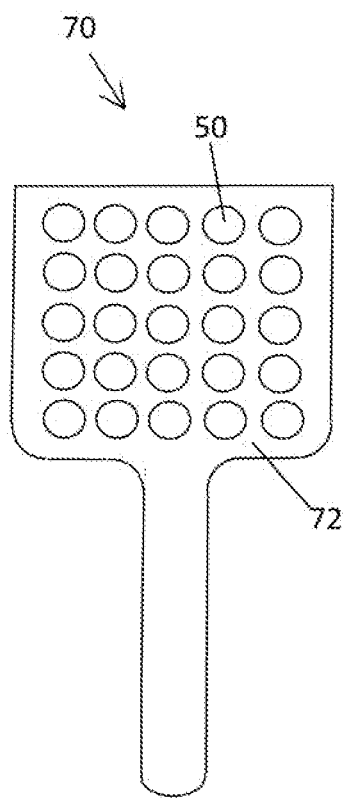
FIG. 10 is a planar view of a monolithic dental hygiene appliance.
Figure 11:
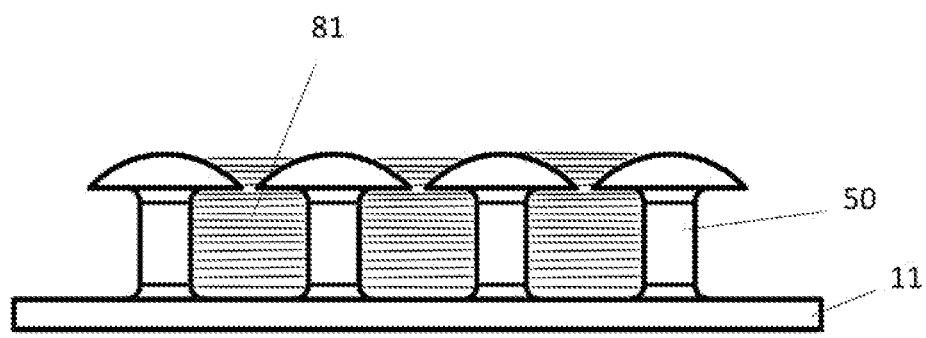
FIG. 11 is an elevation view of a dental hygiene appliance comprising a dentifrice.

Under one embodiment, the dental hygiene appliance is a monolithic body, meaning that the composition of the entire dental hygiene appliance, including the mushroom-shaped bristle, and any other parts of the dental hygiene appliance, such as a handle, are composed of a single material of uniform composition. Such a monolithic dental hygiene appliance may be formed by rapid injection molding or a similar type of method of forming a monolithic body. This is exemplified by FIG. 10.

Under one embodiment, the dental hygiene appliance is an animal toy that can be used by an animal to chew on. Such chewing can be done on a daily basis or on a semi-regular basis or on an occasional basis.

Under one embodiment, the toy is a toy that the animal bites, masticates, or chews on by itself. Such a chew toy can be provided to the animal with limited or no supervision. The animal then chews the chew toy at its leisure, thus cleaning its teeth. The animal's owner or training may also contribute by playing fetch with the animal by using the chew toy. A chew toy of the present invention is a chew toy wherein at least part of its surface comprises the mushroom-shaped bristle described herein, or which is usable as a dental hygiene appliance as defined herein.

Under one embodiment, the toy is a toy that is being used by the animal with the help of the animal owner or trainer. This may be achieved, for example, by playing a tug-of-war with the dog. A tug-of-war toy of the present invention is a tug-of-war toy wherein at least part of its surface comprises the mushroom-shaped bristle described herein, or which is usable as a dental hygiene appliance as defined herein.

Figure 9:
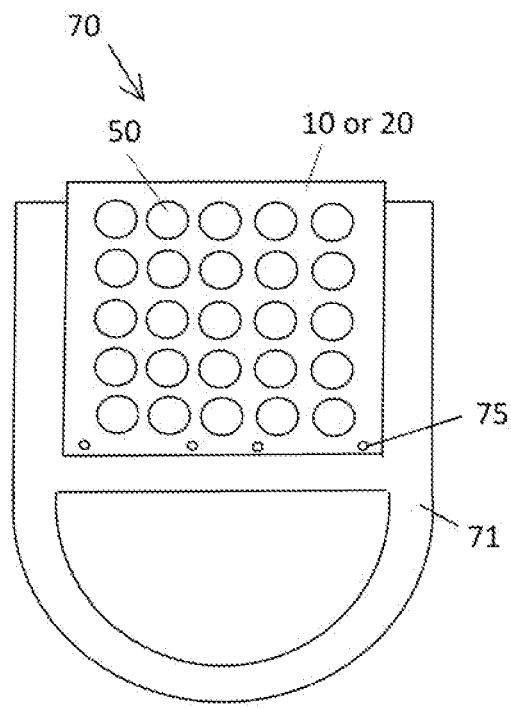
FIG. 9 is a planar view of a dental hygiene appliance comprising a dental hygiene appliance frame and a monofacial or bifacial pad.

Under an alternative embodiment, as exemplified by a FIG. 9, the dental hygiene appliance comprises a monofacial pad 10, or bifacial pad 20, that is held by a dental hygiene appliance frame 71. The monofacial pad 10 or bifacial pad 20 is attached reversibly to the dental hygiene appliance frame 71 by any suitable means. Under one embodiment, the monofacial pad 10 or bifacial pad 20 is attached reversibly to the dental hygiene appliance frame 71 by pegs or screws that protrude through the small orifices 75 in the monofacial pad 10 or bifacial pad 20.

Under one embodiment, the present invention is directed to a monofacial pad for use in a dental hygiene appliance comprising a top surface; and a plurality of mushroom-shaped bristles extending from the top surface, wherein the mushroom-shaped bristles comprise a material with Shore 00 hardness between about 50 and about 100.

Figure 2:
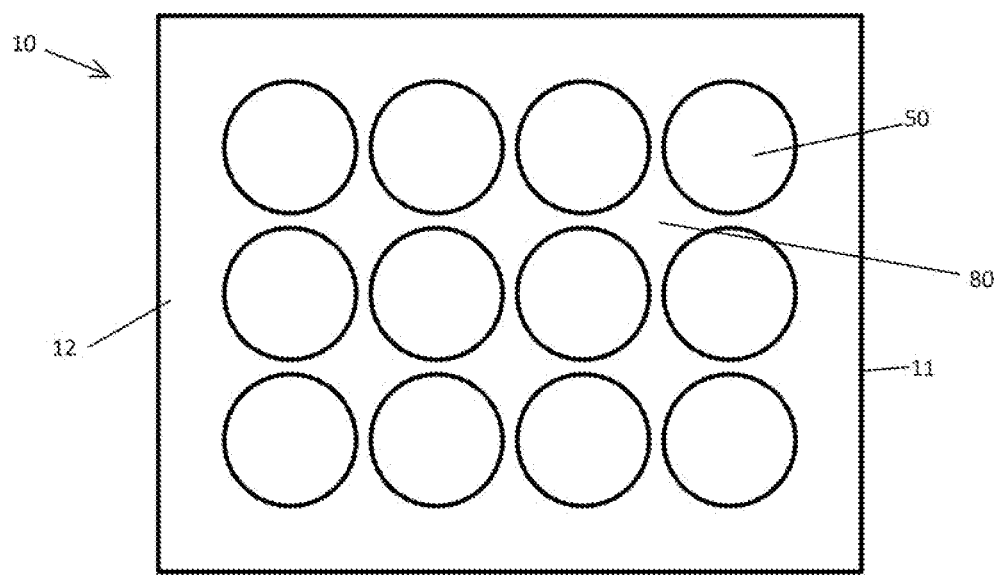
FIG. 2 is a planar view of a monofacial pad comprising a pad base of mushroom-shaped bristles
Figure 3:
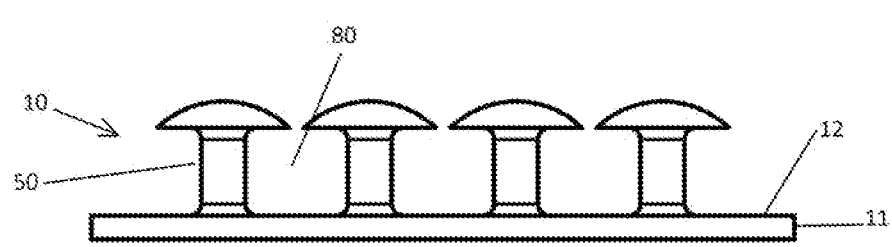
FIG. 3 is an elevation view of a monofacial pad comprising a pad base of mushroom-shaped bristles

The monofacial pad is exemplified by FIG. 1 to FIG. 3. The pad 10 is a flexible and reversibly deformable material that is used in a dental hygiene appliance that is made to accept such pads. The pad 10 comprises a pad base 11 and a mushroom-shaped bristle. The phrase "monofacial pad" means a pad on which the mushroom-shaped bristles are located only on one face of the pad.

Under one embodiment, the present invention is directed to a bifacial pad for use in an oral care appliance comprising: a top surface; a bottom surface; and a plurality of mushroom-shaped bristles extending from the top surface and the bottom surface, wherein the mushroom-shaped bristles comprise a material with Shore 00 hardness between about 50 and about 100.

Figure 4:
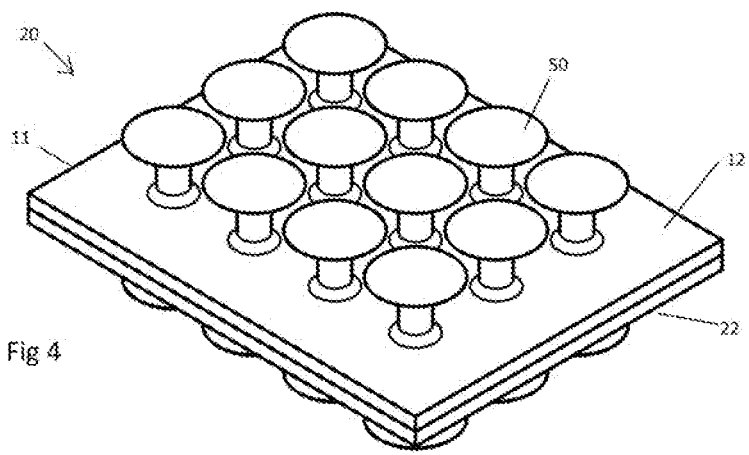
FIG. 4 is a perspective view of a bifacial pad comprising a pad base of mushroom-shaped bristles
Figure 5:
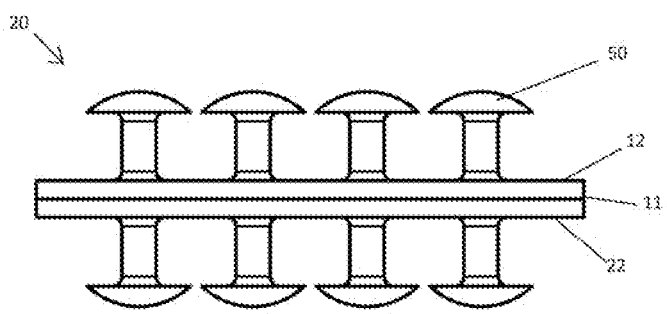
FIG. 5 is an elevation view of a bifacial pad comprising a pad base of mushroom-shaped bristles

The bifacial pad is exemplified by FIG. 4 and FIG. 5. The pad 20 is a flexible and reversibly deformable material that is used in an dental hygiene appliance that is made to accept such pads. The pad 20 comprises a pad base 11 and a mushroom-shaped bristle.

The phrase "monofacial pad" means a pad on which the mushroom-shaped bristles are located only on one face of the pad, whereas the phrase "bifacial pad" means a pad on which the mushroom-shaped bristles are located on both faces of the pad.

The pad base 11 may be of any shape, as long as it is usable in a dental hygiene appliance which is suitable for cleaning teeth. Under one embodiment, the pad is a 3-dimensional piece of a flexible and reversibly deformable material, wherein one dimension is smaller than either of the two other dimensions. Under one embodiment, the smaller dimension is more than 5 times shorter than either of the other two dimensions of the pad base. Under one embodiment, the smaller dimension is more than 10 times shorter than either of the other two dimensions of the pad base. Under one embodiment, the smaller dimension is more than 50 times shorter than either of the other two dimensions of the pad base.

Under one embodiment, the smaller dimension is uniform across all of the points of the pad base. Under one embodiment, the smaller dimension varies across a profile of the pad base.

The pad also has a top surface 12. The top surface is orthogonal to the short side or the smaller dimension of the base of the pad. The pad base 11 in FIGS. 1 to 3 is illustrated as having top surface that is rectangular in shape. However, the top surface can be any shape that is suitable for use as being used in a dental hygiene appliance. Alternative shapes include a triangle, quadrilateral, pentagon, hexagon, heptagon, octagon, and other polygons. Such polygons may be regular (having equal edges and vertex angles), or they can be irregular polygons. Examples of the quadrilateral top surface includes top surfaces that have shapes such as a quadrilateral, bicentric quadrilateral, cyclic quadrilateral, equidiagonal quadrilateral, ex-tangential quadrilateral, harmonic quadrilateral, isosceles trapezoid, kite quadrilateral, lambert quadrilateral, orthodiagonal quadrilateral, parallelogram, rectangle, right kite, rhombus, Saccheri quadrilateral, square, tangential quadrilateral, tangential trapezoidal, trapezoid, and like. Additional alternative shapes for the top surface include a circle, circular segment, crescent, lens, vesica piscis, lune, quatrefoil, Reuleaux polygon, Reuleaux triangle, semicircle, heart, and like.

The dental hygiene appliance, or the monofacial pad, or the bifacial pad of the present invention comprises mushroom-shaped bristles extending from the top surface, and optionally, from the bottom surface. The term "bristle" as used herein, means any protrusion from the body of a dental hygiene appliance, which when in contact against a patient's tooth, or when rubbed against the tooth, with or without dentifrice, helps to clean the tooth or reduce bacterial growth.

The phrase "mushroom-shaped bristle" means that the bristle has a shape that roughly resembles a prototypical mycological mushroom. Each of the mushroom-shaped bristles comprises at least a pileus and a stipe.

Under one embodiment, the mushroom-shaped bristle is made from the same material as the pad base or the dental hygiene appliance. Under an alternative embodiment, the mushroom-shaped bristle is made of a different material than the pad base of the dental hygiene appliance.

Under one embodiment, the material which comprises the mushroom-shaped bristle has approximately the same Shore 00 hardness as the dental hygiene appliance, the monofacial pad, or the bifacial pad. Under one embodiment, the material which comprises the mushroom-shaped bristle has greater Shore 00 hardness as the dental hygiene appliance, the monofacial pad, or the bifacial pad. Under one embodiment, the material which comprises the mushroom-shaped bristle has lower Shore 00 hardness as the dental hygiene appliance, the monofacial pad, or the bifacial pad.

The term "pileus" corresponds roughly to the cap-like portion of the mushroom. The pileus is approximately circular in the same plane as the top surface. The thickness of the pileus is less than its diameter.

Under one embodiment, the pileus has approximately a circular projection. The term "projection" when referring to the projection of pileus, refers to the view that is orthogonal to the plane made by the top surface of the pad. An example of the projection of pileus is illustrated in FIG. 2 or 8.

Under one embodiment, the pileus has approximately a square projection. The mushroom-shaped bristles with pileus of approximately a square projection are suitable for dental hygiene appliance wherein the mushroom-shaped bristles are packed in the square packing.

Under one embodiment, the pileus has approximately a Reuleaux square projection. The mushroom-shaped bristles with pileus of approximately a Reuleaux square projection are suitable for dental hygiene appliance wherein the mushroom-shaped bristles are packed in the square packing.

The phrase "square packing" refers to a two-dimensional array of mushroom-shaped bristle, wherein a mushroom-shaped bristle is equidistant to 4 other mushroom-shaped bristles. An example of square packing with mushroom-shaped bristle with circular pileus projection is seen in FIGS. 2 and 8.

Under one embodiment, the pileus has approximately a regular hexagonal projection. The mushroom-shaped bristles with pileus of approximately a regular hexagonal projection are suitable for dental hygiene appliance wherein the mushroom-shaped bristles are packed in a hexagonal packing.

Under one embodiment, the pileus has approximately a Reuleaux hexagonal projection. The mushroom-shaped bristles with pileus of approximately a Reuleaux hexagonal projection are suitable for dental hygiene appliance wherein the mushroom-shaped bristles are packed in a hexagonal packing.

The phrase "hexagonal packing" refers to a two-dimensional array of mushroom-shaped bristle, wherein a mushroom-shaped bristle is equidistant to 6 other mushroom-shaped bristles. An example of hexagonal packing is a honeycomb.

The space between the mushroom-shaped bristles is an interstitial space 80 between mushroom-shaped bristle 50.

The profile of the pileus may be varied depending on the animal, teeth, and hardness of the material, but is generally selected so that either the top of the pileus or the bottom of the pileus contacts well with the surface of the teeth of the animal.

Figure 6:
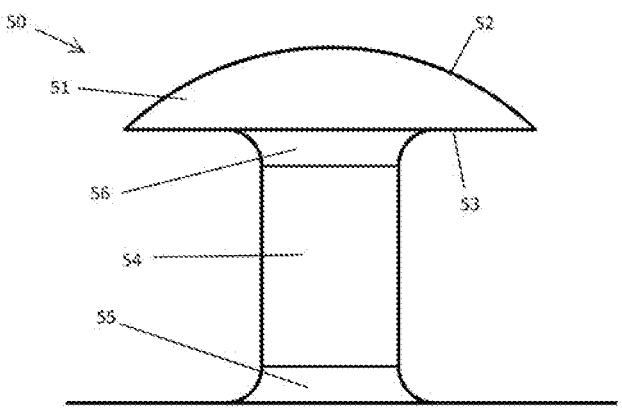
FIG. 6 is an elevation view of a single mushroom-shaped bristle

The term "profile" when referring to the profile of the pileus or the mushroom-shaped bristle refers to the elevation view of the pileus or the mushroom-shaped bristle. An example of a profile of pileus is illustrated in FIGS. 3, 5, and 6.

Under one embodiment, as illustrated in FIGS. 1 to 3, the pileus has a convex shape. In this shape, the bottom of the pileus is approximately flat (meaning that the bottom of the pileus is a plane that is parallel to the top surface of the pad base) and the top of the pileus is a spherical cap, so that the profile of the pileus is a circular segment. This shape is exemplified in FIG. 8(d).

Under one embodiment, the pileus has a conical shape. In this shape, the bottom of the pileus is approximately flat and the top of the pileus resembles the geometric cone. The profile of the top of the pileus resembles a parabola. This shape is exemplified in FIG. 8(a).

Under one embodiment, the pileus has an ovate shape. In this shape, the bottom of the pileus is approximately flat and the top of the pileus resembles a prolate hemispheroid. The profile of the top of the pileus resembles an ellipse.

Under one embodiment, the pileus has a flat shape. In this shape, the bottom of the pileus is approximately flat and the top of the pileus resembles a frustrated hemisphere. The profile of the top of the pileus resembles a Frisbee disc.

Under one embodiment, the pileus has a plane shape. In this shape, the bottom of the pileus is curved upwards, and the top of the pileus approximately flat. The profile of the pileus resembles that of the flat shape, expected that it is upside down. This shape is exemplified in FIG. 8(e).

Under one embodiment, the pileus has a campanulate shape or a bell shape. In this shape, the pileus resembles a bell. This shape is exemplified in FIG. 8(b).

Under one embodiment, the pileus has a depressed shape. In this shape, the top, or at least a portion of the top, of the pileus is concave, and the bottom is either approximately flat or curved upwards. This shape is exemplified in FIG. 8(h).

Under one embodiment, the pileus has an infundibuliform shape or a funnel shape. In this shape, the top of the pileus has a depression, and the bottom of the pileus is sharply curved upwards. This shape is exemplified in FIG. 8(i).

During the process of forming the pad or the dental hygiene appliance or any other article of manufacture that comprises the mushroom-shaped bristles, the uneven cooling or post-mold expansion or contraction of the material. For a mushroom-shaped bristle that have approximately C∞v symmetry, this means that above the stipe, the pileus may exhibit either a depression or a bump in at least a portion of the pileus.

Under one embodiment, the pileus has an umbonate shape. In this shape, the pileus has any of the proceeding shapes, except that the center of the pileus exhibits a bump. This bump may be slight, or it may be rise to significantly increase the thickness of the pileus above the stipe. This shape is exemplified in FIG. 8(c).

Under one embodiment, the pileus has an umbilicate shape. In this shape, the pileus has any of the proceeding shapes, except that the center of the pileus exhibits a depression. This bump may be slight, or it may be a depression that significantly decrease the thickness of the pileus above the stipe. This shape is exemplified in FIG. 8(g).

The phrase "curved upwards" when referring to the bottom of the pileus, means that the points on the bottom of the pileus that are further away from the stipe are also further away from the top surface of the pad base surface.

The terms "convex", "conical", "ovate", "flat", "plane", "campanulate", "bell", "depressed", "infundibuliform", "funnel", "umbonate", and "umbilicate" when referring to the shape of the pileus are adopted from the terminology of the shapes of mushroom caps as used in mycology. See, for example, D. Arora, *Mushrooms Demystified*, second ed., Ten Speed Press (Berkeley, Calif., USA), 1986, ISBN 0-89815-169-4, p. 17.

Each of the mushroom-shaped bristles comprises at least a pileus and a stipe. The term "stipe" is synonymous with, or similar to, the term "stem", or "stalk" as used in mycology.

The stipe is a column that connects the pileus from the pad base. The stipe may have any shape that allows the pileus to be connected with the pad base. Under one embodiment, the stipe is flexible enough to be reversibly deformed by biting or masticating of the mushroom-shaped bristle Under one embodiment, the stipe has a cylindrical shape. Under one embodiment, the stipe has a right cylindrical shape. Under one embodiment, the stipe has an oblique cylindrical shape. The oblique cylindrical shape may be offset from the perpendicular at any angle between 0° and about 50°.

Under one embodiment, the oblique cylindrical shape is offset from the perpendicular at an angle between 0° and about 10°. Under one embodiment, the oblique cylindrical shape is offset from the perpendicular at an angle between 0° and about 20°. Under one embodiment, the oblique cylindrical shape is offset from the perpendicular at an angle between 0° and about 30°. Under one embodiment, the oblique cylindrical shape is offset from the perpendicular at an angle between 0° and about 40°. Under one embodiment, the oblique cylindrical shape is offset from the perpendicular at an angle between 0° and about 50°. Under one embodiment, the oblique cylindrical shape is offset from the perpendicular at an angle between about 10° and about 20°. Under one embodiment, the oblique cylindrical shape is offset from the perpendicular at an angle between about 10° and about 30°. Under one embodiment, the oblique cylindrical shape is offset from the perpendicular at an angle between about 10° and about 40°. Under one embodiment, the oblique cylindrical shape is offset from the perpendicular at an angle between about 10° and about 50°. Under one embodiment, the oblique cylindrical shape is offset from the perpendicular at an angle between about 20° and about 30°. Under one embodiment, the oblique cylindrical shape is offset from the perpendicular at an angle between about 20° and about 40°. Under one embodiment, the oblique cylindrical shape is offset from the perpendicular at an angle between about 20° and about 50°. Under one embodiment, the oblique cylindrical shape is offset from the perpendicular at an angle between about 30° and about 40°. Under one embodiment, the oblique cylindrical shape is offset from the perpendicular at an angle between about 30° and about 50°. Under one embodiment, the oblique cylindrical shape is offset from the perpendicular at an angle between about 40° and about 50°.

The stipe may have any profile suitable for the use of cleaning teeth. Under one embodiment, the projection of the stipe is selected from the group consisting of a polygon, a circle, an oval, an ovoid, a circular segment, a crescent, a lens, a vesica piscis, a lune, a quatrefoil, a Reuleaux polygon, a Reuleaux triangle, a semicircle, a heart, and like.

Under one embodiment, the projection of the stipe has a shape of a rectangle, triangle, quadrilateral, pentagon, hexagon, heptagon, octagon, and other polygons. Examples of suitable polygons include a convex polygon, a concave polygon, a cyclic polygon, an equiangular polygon, an equilateral polygon, a regular polygon, a simple polygon, a tangential polygon, and like. Examples of quadrilaterally shaped stipe projections includes stipe projections that have shapes such as a quadrilateral, bicentric quadrilateral, cyclic quadrilateral, equidiagonal quadrilateral, ex-tangential quadrilateral, harmonic quadrilateral, isosceles trapezoid, kite quadrilateral, lambert quadrilateral, orthodiagonal quadrilateral, parallelogram, rectangle, right kite, rhombus, Saccheri quadrilateral, square, tangential quadrilateral, tangential trapezoidal, trapezoid, and like.

The projection of the stipe may or may not vary with the distance from the pad surface or the pileus. Under one embodiment, the projection of the stipe along the column does not significant vary. Under an alternative embodiment, the projection of the stipe varies with the distance between the pad base and the pileus.

The present invention is also directed to a pad or a dental hygiene appliance that comprises mushroom-shaped bristles, wherein at least one of the mushroom-shaped bristles 50 comprises a pileus 51 and a stipe 54, wherein the pileus further comprises a brim 60.

The brim 60 is a thin extension of the pileus away from the center of the pileus, roughly orthogonal to the stipe or parallel to the pad surface. Another term for "brim" is a "cusp".

The brim 60, under one embodiment, surrounds the entire pileus, to provide a 360° coverage. Examples of mushroom-shaped bristles with a 360° brim are illustrated in FIGS. 7 to 11.

Under an alternative embodiment, the brim 60 is found to extend less than 360° around the pileus.

The brim may extend out from the pileus out in a flat plane that is parallel to the pad top surface. This may be similar to the brim of a boater hat, or a Panama hat.

Under one embodiment, the brim extends from the pileus in a way that it appears that it droops down so that the outer edge of the brim is closer to the pad base than the part of the brim that closer to the stipe.

Under one embodiment, the brim extends from the pileus in a way that it appears that it is turned up, so that the outer edge of the brim is further from the pad base than the part of the brim that closer to the stipe. This may be similar to the brim of a bowler hat or a pork pie hat. An example of such upturned brim is shown in FIGS. 7 to 11.

The present invention is also directed to a pad or a dental hygiene appliance, wherein the brim 60 comprises an underbrim surface 61, and an overbrim surface 62, wherein biting of the pad or the dental hygiene appliance by a patient provides a rubbing action of the underbrim or overbrim with the patient's teeth.

One of the advantages of having a brim is that it offers a larger area for dental hygiene appliance to interact with the tooth surface. This is true with either a dentifrice or without a dentifrice.

Another advantage of having a brim is that the thinness of the brim allows the brim to get into crevices of teeth that are too small for pileus to enter.

Yet another advantage of having a brim is that the thinness of the brim allows the flexibility to let a greater area of the mushroom-shaped bristles be in contact with the tooth.

The pad comprises a plurality of mushroom-shaped bristles extending from the top surface. The plurality means more than 1. The number of mushroom-shaped bristles on the pad or on the dental hygiene appliance may be more than 10 or more than 100 or more than 1000.

Under one embodiment, the number of mushroom-shaped bristles on the pad or on the dental hygiene appliance is between 2 and 5. Under one embodiment, the number of mushroom-shaped bristles on the pad or on the dental hygiene appliance is between 2 and 10. Under one embodiment, the number of mushroom-shaped bristles on the pad or on the dental hygiene appliance is between 2 and about 30. Under one embodiment, the number of mushroom-shaped bristles on the pad or on the dental hygiene appliance is between 2 and about 100. Under one embodiment, the number of mushroom-shaped bristles on the pad or on the dental hygiene appliance is between 2 and about 300. Under one embodiment, the number of mushroom-shaped bristles on the pad or on the dental hygiene appliance is between 2 and about 1000. Under one embodiment, the number of mushroom-shaped bristles on the pad or on the dental hygiene appliance is between 5 and 10. Under one embodiment, the number of mushroom-shaped bristles on the pad or on the dental hygiene appliance is between 5 and about 30. Under one embodiment, the number of mushroom-shaped bristles on the pad or on the dental hygiene appliance is between 5 and about 100. Under one embodiment, the number of mushroom-shaped bristles on the pad or on the dental hygiene appliance is between 5 and about 300. Under one embodiment, the number of mushroom-shaped bristles on the pad or on the dental hygiene appliance is between 5 and about 1000. Under one embodiment, the number of mushroom-shaped bristles on the pad or on the dental hygiene appliance is between 10 and about 30. Under one embodiment, the number of mushroom-shaped bristles on the pad or on the dental hygiene appliance is between 10 and about 100. Under one embodiment, the number of mushroom-shaped bristles on the pad or on the dental hygiene appliance is between 10 and about 300. Under one embodiment, the number of mushroom-shaped bristles on the pad or on the dental hygiene appliance is between 10 and about 1000. Under one embodiment, the number of mushroom-shaped bristles on the pad or on the dental hygiene appliance is between 30 and about 100. Under one embodiment, the number of mushroom-shaped bristles on the pad or on the dental hygiene appliance is between 30 and about 300. Under one embodiment, the number of mushroom-shaped bristles on the pad or on the dental hygiene appliance is between 30 and about 1000. Under one embodiment, the number of mushroom-shaped bristles on the pad or on the dental hygiene appliance is between 100 and about 300. Under one embodiment, the number of mushroom-shaped bristles on the pad or on the dental hygiene appliance is between 100 and about 1000. Under one embodiment, the number of mushroom-shaped bristles on the pad or on the dental hygiene appliance is between 300 and about 1000.

The dental hygiene appliance, pad, mushroom-shaped bristle, and other parts of the dental hygiene appliance, are of the size and dimensions that are suitable for use as dental hygiene appliance.

The mean diameter of the dental hygiene appliance measures from 5 cm to 30 cm. Under one embodiment, the mean diameter of the dental hygiene appliance measures from about 5 cm to about 30 cm. Under one embodiment, the mean diameter of the dental hygiene appliance measures from about 10 cm to about 30 cm. Under one embodiment, the mean diameter of the dental hygiene appliance measures from about 5 cm to about 30 cm. Under one embodiment, the mean diameter of the dental hygiene appliance measures from about 15 cm to about 30 cm. Under one embodiment, the mean diameter of the dental hygiene appliance measures from about 20 cm to about 30 cm. Under one embodiment, the mean diameter of the dental hygiene appliance measures from about 25 cm to about 30 cm. Under one embodiment, the mean diameter of the dental hygiene appliance measures from about 5 cm to about 25 cm. Under one embodiment, the mean diameter of the dental hygiene appliance measures from about 10 cm to about 25 cm. Under one embodiment, the mean diameter of the dental hygiene appliance measures from about 5 cm to about 25 cm. Under one embodiment, the mean diameter of the dental hygiene appliance measures from about 15 cm to about 25 cm. Under one embodiment, the mean diameter of the dental hygiene appliance measures from about 20 cm to about 25 cm. Under one embpdment, the mean diameter of the dental hygiene appliance measures from about 5 cm to about 20 cm. Under one embodiment, the mean diameter of the dental hygiene appliance measures from about 10 cm to about 20 cm. Under one embodiment, the mean diameter of the dental hygiene appliance measures from about 5 cm to about 20 cm. Under one embodiment, the mean diameter of the dental hygiene appliance measures from about 15 cm to about 20 cm. Under one embodiment, the mean diameter of the dental hygiene appliance measures from about 5 cm to about 15 cm. Under one embodiment, the mean diameter of the dental hygiene appliance measures from about 10 cm to about 15 cm. Under one embodiment, the mean diameter of the dental hygiene appliance measures from about 5 cm to about 10 cm.

The height of each of the mushroom-shaped bristles ranges from about 5 mm to about 20 mm. Under one embodiment, the height of each of the mushroom-shaped bristle range from about 5 mm to about 8 mm. Under one embodiment, the height of each of the mushroom-shaped bristle range from about 5 mm to about 12 mm. Under one embodiment, the height of each of the mushroom-shaped bristle range from about 5 mm to about 16 mm. Under one embodiment, the height of each of the mushroom-shaped bristle range from about 5 mm to about 20 mm. Under one embodiment, the height of each of the mushroom-shaped bristle range from about 8 mm to about 12 mm. Under one embodiment, the height of each of the mushroom-shaped bristle range from about 8 mm to about 16 mm. Under one embodiment, the height of each of the mushroom-shaped bristle range from about 8 mm to about 20 mm. Under one embodiment, the height of each of the mushroom-shaped bristle range from about 12 mm to about 16 mm. Under one embodiment, the height of each of the mushroom-shaped bristle range from about 12 mm to about 20 mm. Under one embodiment, the height of each of the mushroom-shaped bristle range from about 16 mm to about 20 mm.

The diameter of the pileus ranges from 5 mm to 30 mm. Under one embodiment, the diameter of the pileus range from 5 mm to 30 mm. Under one embodiment, the diameter of the pileus range from 10 mm to 30 mm. Under one embodiment, the diameter of the pileus range from 15 mm to 30 mm. Under one embodiment, the diameter of the pileus range from 20 mm to 30 mm. Under one embodiment, the diameter of the pileus range from 25 mm to 30 mm. Under one embodiment, the diameter of the pileus range from 5 mm to 25 mm. Under one embpdment, the diameter of the pileus range from 10 mm to 25 mm. Under one embodiment, the diameter of the pileus range from 15 mm to 25 mm. Under one embodiment, the diameter of the pileus range from 20 mm to 25 mm. Under one embodiment, the diameter of the pileus range from 5 mm to 20 mm. Under one embodiment, the diameter of the pileus range from 10 mm to 20 mm. Under one embodiment, the diameter of the pileus range from 15 mm to 20 mm. Under one embodiment, the diameter of the pileus range from 5 mm to 15 mm. Under one embodiment, the diameter of the pileus range from 10 mm to 15 mm. Under one embodiment, the diameter of the pileus range from 5 mm to 10 mm.

The ratio of the mean diameter of the pileus to the mean diameter of the stipe is between about 3:1 to about 20:1. Under one embodiment, the ratio of the mean diameter of the pileus to the mean diameter of the stipe is between about 3:1 to about 20:1. Under one embodiment, the ratio of the mean diameter of the pileus to the mean diameter of the stipe is between about 5:1 to about 20:1. Under one embodiment, the ratio of the mean diameter of the pileus to the mean diameter of the stipe is between about 8:1 to about 20:1. Under one embodiment, the ratio of the mean diameter of the pileus to the mean diameter of the stipe is between about 12:1 to about 20:1. Under one embodiment, the ratio of the mean diameter of the pileus to the mean diameter of the stipe is between about 16:1 to about 20:1. Under one embodiment, the ratio of the mean diameter of the pileus to the mean diameter of the stipe is between about 3:1 to about 16:1. Under one embodiment, the ratio of the mean diameter of the pileus to the mean diameter of the stipe is between about 5:1 to about 16:1. Under one embodiment, the ratio of the mean diameter of the pileus to the mean diameter of the stipe is between about 8:1 to about 16:1. Under one embodiment, the ratio of the mean diameter of the pileus to the mean diameter of the stipe is between about 12:1 to about 16:1. Under one embodiment, the ratio of the mean diameter of the pileus to the mean diameter of the stipe is between about 3:1 to about 12:1. Under one embodiment, the ratio of the mean diameter of the pileus to the mean diameter of the stipe is between about 5:1 to about 12:1. Under one embodiment, the ratio of the mean diameter of the pileus to the mean diameter of the stipe is between about 8:1 to about 12:1. Under one embodiment, the ratio of the mean diameter of the pileus to the mean diameter of the stipe is between about 3:1 to about 8:1. Under one embodiment, the ratio of the mean diameter of the pileus to the mean diameter of the stipe is between about 5:1 to about 8:1. Under one embodiment, the ratio of the mean diameter of the pileus to the mean diameter of the stipe is between about 3:1 to about 5:1.

The present invention is directed to a dental hygiene appliance or to a monofacial or a bifacial pad for use in dental hygiene appliance, comprising a plurality the mushroom-shaped bristles, wherein the mushroom-shaped bristles comprise a material with Shore 00 hardness between about 50 and about 100.

The phrase Shore 00 hardness between about 50 to about 100, means that the observed laboratory values using a standard method such as ASTM D2240, exhibit value between about 50 and about 100 on the Shore 00 scale.

Shore Hardness is a measure of the hardness of a given material or how resistant it will be to indentation. It is measured by the depth of indentation that is created on the material with a specified force. Under one embodiment, the Shore hardness is measured by ASTM D2240. Under one embodiment, the Shore hardness is measured by ASTM D2240-15.

The mushroom-shaped bristles comprise a material with Shore 00 hardness between about 50 and about 100.

Under one embodiment, the mushroom-shaped bristles comprise a material with Shore 00 hardness between about 50 and about 100, as determined by ASTM D2240-15. Under one embodiment, the mushroom-shaped bristles comprise a material with Shore 00 hardness between about 60 and about 100, as determined by ASTM D2240-15. Under one embodiment, the mushroom-shaped bristles comprise a material with Shore 00 hardness between about 70 and about 100, as determined by ASTM D2240-15. Under one embodiment, the mushroom-shaped bristles comprise a material with Shore 00 hardness between about 75 and about 100, as determined by ASTM D2240-15. Under one embodiment, the mushroom-shaped bristles comprise a material with Shore 00 hardness between about 80 and about 100, as determined by ASTM D2240-15. Under one embodiment, the mushroom-shaped bristles comprise a material with Shore 00 hardness between about 85 and about 100, as determined by ASTM D2240-15. Under one embodiment, the mushroom-shaped bristles comprise a material with Shore 00 hardness between about 90 and about 100, as determined by ASTM D2240-15.

Under one embodiment, the mushroom-shaped bristles comprise a material with Shore 00 hardness between about 50 and about 90, as determined by ASTM D2240-15. Under one embodiment, the mushroom-shaped bristles comprise a material with Shore 00 hardness between about 60 and about 90, as determined by ASTM D2240-15. Under one embodiment, the mushroom-shaped bristles comprise a material with Shore 00 hardness between about 70 and about 90, as determined by ASTM D2240-15. Under one embodiment, the mushroom-shaped bristles comprise a material with Shore 00 hardness between about 75 and about 90, as determined by ASTM D2240-15. Under one embodiment, the mushroom-shaped bristles comprise a material with Shore 00 hardness between about 80 and about 90, as determined by ASTM D2240-15. Under one embodiment, the mushroom-shaped bristles comprise a material with Shore 00 hardness between about 85 and about 90, as determined by ASTM D2240-15.

Under one embodiment, the mushroom-shaped bristles comprise a material with Shore 00 hardness between about 50 and about 85, as determined by ASTM D2240-15. Under one embodiment, the mushroom-shaped bristles comprise a material with Shore 00 hardness between about 60 and about 85, as determined by ASTM D2240-15. Under one embodiment, the mushroom-shaped bristles comprise a material with Shore 00 hardness between about 70 and about 85, as determined by ASTM D2240-15. Under one embodiment, the mushroom-shaped bristles comprise a material with Shore 00 hardness between about 75 and about 85, as determined by ASTM D2240-15. Under one embodiment, the mushroom-shaped bristles comprise a material with Shore 00 hardness between about 80 and about 85, as determined by ASTM D2240-15.

Under one embodiment, the mushroom-shaped bristles comprise a material with Shore 00 hardness between about 50 and about 80, as determined by ASTM D2240-15. Under one embodiment, the mushroom-shaped bristles comprise a material with Shore 00 hardness between about 60 and about 80, as determined by ASTM D2240-15. Under one embodiment, the mushroom-shaped bristles comprise a material with Shore 00 hardness between about 70 and about 80, as determined by ASTM D2240-15. Under one embodiment, the mushroom-shaped bristles comprise a material with Shore 00 hardness between about 75 and about 80, as determined by ASTM D2240-15. Under one embodiment, the mushroom-shaped bristles comprise a material with Shore 00 hardness between about 50 and about 75, as determined by ASTM D2240-15. Under one embodiment, the mushroom-shaped bristles comprise a material with Shore 00 hardness between about 60 and about 75, as determined by ASTM D2240-15. Under one embodiment, the mushroom-shaped bristles comprise a material with Shore 00 hardness between about 70 and about 75, as determined by ASTM D2240-15. Under one embodiment, the mushroom-shaped bristles comprise a material with Shore 00 hardness between about 50 and about 70, as determined by ASTM D2240-15. Under one embodiment, the mushroom-shaped bristles comprise a material with Shore 00 hardness between about 60 and about 70, as determined by ASTM D2240-15. Under one embodiment, the mushroom-shaped bristles comprise a material with Shore 00 hardness between about 50 and about 60, as determined by ASTM D2240-15.

Under one embodiment, dental hygiene appliance, the monofacial pad, or bifacial pad of the present invention is made of a material that comprises a polymer selected from the group consisting of polyalkenes, polyisoprene, polybutadiene, poly(alkyl acrylate and methacrylate), polyvinyl alcohol, polystyrene, styrene butadiene, polyesters, polyethylene terephthalate, polyamide, polyurea, polycarbonate, copolymers thereof, and mixtures thereof.

Polyalkene is also known as polyolefins. A polyalkene is a type of polymer produced from a simple olefin (also called an alkene with the general formula $C_nH_{2n}$) as a monomer. Examples of polyalkenes include poly(butylene), poly(butyl ethylene), poly(cyclohexylethylene), poly(ethylene), poly(heptylethylene), poly(hexylethylene), poly(isobutene), poly(isobutylethylene), poly(isopropylethylene), poly(2-methylbutene), poly(octylethylene), poly(pentylethylene), poly(propylene), poly(propylethylene), poly(tert-butylethylene), copolymers thereof, and mixtures thereof.

Polyisoprene is a collective name for polymers that are produced by polymerization of isoprene. Isoprene has the formula $CH_2$—C(Me)—CH=$CH_2$. The definition polyisoprene includes polymers of four different isomers.

Polybutadiene, also known as butadiene rubber, is a synthetic rubber. Polybutadiene rubber is a polymer formed from the polymerization of the monomer 1,3-butadiene.

Poly(alkyl acrylate and methacrylate) include acrylic elastomers. Acrylic elastomer is a type of synthetic rubber whose main component is acrylic acid alkylester (ethyl or butyl ester). An acrylic elastomer has characteristics of heat and oil resistance.

Poly(vinyl alcohol), or PVA, or PVOH, or PVA1, is a water-soluble synthetic polymer with the idealized formula $[CH_2CH(OH)]_n$. It is used in papermaking, textiles, and a variety of coatings. It is colorless (white) and odorless. It is sometimes supplied as beads or as solutions in water.

Polystyrene, or PS, is a synthetic aromatic hydrocarbon polymer made from the monomer styrene, with a formula $[CHPh—CH_2]_n$.

Under one embodiment, styrene-butadiene or styrene-butadiene rubber (SBR) describe families of synthetic rubbers derived from styrene and butadiene.

Polyester is a category of polymers that contain the ester functional group in their main chain. As a specific material, it most commonly refers to a type called polyethylene terephthalate (PET).

Polyethylene terephthalate (sometimes written poly(ethylene terephthalate)), commonly abbreviated PET, PETE, or the obsolete PETP or PET-P, is the most common thermoplastic polymer resin of the polyester family and is used in fibers for clothing, containers for liquids and foods, thermoforming for manufacturing, and in combination with glass fiber for engineering resins.

A polyamide is a macromolecule with repeating units linked by amide bonds.

Polyurea is a type of elastomer that is derived from the reaction product of an isocyanate component and a synthetic resin blend component through step-growth polymerization. The isocyanate can be aromatic or aliphatic in nature.

Polycarbonates are a group of thermoplastic polymers containing carbonate groups in their chemical structures.

The dental hygiene appliance or the pad is prepared by a suitable method to result in a well-formed, well-defined dental hygiene appliance comprising mushroom-shaped bristles. Exemplary methods of producing the dental hygiene appliance or the pad associated therewith include blow molding, rotational molding, injection molding, reaction injection molding, structural reaction injection molding, and like.

Under one embodiment, the present invention is directed to a dental hygiene appliance, monofacial pad, or a bifacial pad, comprising mushroom-shaped bristles 50, wherein an interstitial space 80 between the mushroom-shaped bristles comprises a dentifrice composition 81 comprising an aqueous gel prepared from the group consisting of oligosaccharide, polysaccharide, starch, cellulose, sodium carboxymethyl cellulose, sodium alginate, polylactic acid, polygluconic acid, copolymers thereof, and mixtures thereof.

The dentifrice is on sufficient high viscosity or hardness that it does not flow out of the interstitial space 80. Under one embodiment, the dentifrice is a gel that the animal's owner or trainer places into the interstitial space 80. Under one embodiment, the dental hygiene appliance or the pad is purchased by the animal's owner or trainer with the dentifrice already preloaded on the pad or dental hygiene appliance.

The dentifrice may fill the interstitial space fully or partially. Under one embodiment, the dentifrice may reach to the stipe top 56. Under one embodiment, the dentifrice fills the interstitial space to the top of the pileus.

The term "dentifrice" should be interpreted broadly. Under one embodiment, the viscosity of the dentifrice is significantly greater than that of toothpaste. Under one embodiment, the dentifrice has a Shore 00 hardness of about 15 to 30 less than the Shore 00 hardness of the mushroom-shaped bristle. One reason for the higher viscosity or hardness compared of the dentifrice to the viscosity of hardness of a typical toothpaste is because the animal chews on the dental hygiene appliance and dentifrice slowly is worn out of the dental hygiene appliance or the pad.

Under one embodiment, the dentifrice comprises activated edathamil. The activation of an FDA-approved, food-safe chelator, edathamil, allows the edathamil to penetrate into a biofilm and reduce the calcium levels in the plaque fluid. The term edathamil is defined broadly, to include the chelating agent EDTA, ethylenediaminetetraacetic acid, $(HOOCCH_2)_2N(CH_2)_2N(CH_2COOH)_2$, and their salts thereof. The activated edathamil, in the form of a dentifrice, is thought to strategically disrupt the calcium levels in the biofilm, resulting in a dramatic reduction in plaque. A study comparing a documented that a gel with activated edathamil is significantly more effective at reducing plaque, reducing gingival inflammation, and reducing gingival bleeding than the control toothpaste. *J. Bacteriol.* 2012; vol. 194, iss. 24, p 6782-9.

An oligosaccharide is a saccharide polymer containing a small number (typically three to ten of monosaccharides (simple sugars).

Polysaccharides are long chains of carbohydrate molecules, specifically polymeric carbohydrates composed of monosaccharide units bound together by glycosidic linkages. This carbohydrate can react with water (hydrolysis) using amylase enzymes at catalyst, which produces constituent sugars (monosaccharides, or oligosaccharides). They range in structure from linear to highly branched. Examples include storage polysaccharides such as starch and glycogen, and structural polysaccharides such as cellulose and chitin. Under one embodiment, the polysaccharides of the present invention are heterogeneous, containing slight modifications of the repeating unit. Depending on the structure, these macromolecules can have distinct properties from their monosaccharide building blocks.

Starch or amylum is a polymeric carbohydrate consisting of numerous glucose units joined by glycosidic bonds. This polysaccharide is produced by most green plants as energy storage. It is the most common carbohydrate in human diets and is contained in large amounts in staple foods like potatoes, wheat, maize (corn), rice, and cassava. Starch consists of two types of molecules: the linear and helical amylose and the branched amylopectin. Depending on the plant, starch generally contains 20 to 25% amylose and 75 to 80% amylopectin by weight. Glycogen, the glucose store of animals, is a more highly branched version of amylopectin.

Cellulose is a polysaccharide consisting of a linear chain of several hundred to many thousands of β(1→4) linked D-glucose units.

Carboxymethyl cellulose (CMC) or cellulose gum is a cellulose derivative with carboxymethyl groups ($—CH_2—COOH$) bound to some of the hydroxyl groups of the glucopyranose monomers that make up the cellulose backbone. Under one embodiment, CMC is used as its sodium salt, sodium carboxymethyl cellulose.

Alginic acid, also called algin, is a polysaccharide distributed widely in the cell walls of brown algae that is hydrophilic and forms a viscous gum when hydrated. With metals such as sodium and calcium, its salts are known as alginates.

Polylactic acid or polylactide (PLA) is a thermoplastic aliphatic polyester derived from renewable resources. Polylactic acid has the formula $[CMeH—CO—O]_n$.

The animal tooth cleaning device of this invention comprises an inner gelatin based formulation encased or partially encased within an outer more rigid gel formulation. The outer gel can comprise any suitable formulation that provides enhanced rigidity and is safe for chewing and ingestion. Examples of such gels include gels made from the ionic crosslinking of polysaccharides such as aqueous solutions of sodium alginates and sodium carboxymethyl cellulose (CMC). Typical ionic crosslinkers include divalent, trivalent or polyvalent cations such as $Ca^{2+}$, $Mg^{2+}$, $Al^{3+}$ and the like. Under one embodiment, the polyvalent cations are safe for ingestion.

The dentifrice may be formed by adding the aqueous solution of an appropriate salt such as, but not limited to, calcium gluconate, calcium lactate, calcium acetate, magnesium sulfate, alum, aluminum sulfate and the like, with stirring, to an aqueous solution of the gel-forming polymer. At a given polymer concentration, the viscosity of polymer solutions increases with the polymer molecular weight. Because higher polymer concentrations provide more rigid gel structures, Under one embodiment, lower molecular weight polymers are used. Lower viscosities facilitate the mixing of the polymer solution with the ionic salt solution. This is particularly important as, in some instances, gel formation can be very rapid, preventing the formation of a uniform gel or providing insufficient open time for molding. In such instances, gel formation can be slowed down by the use of a complexing or chelating agent such as sodium citrate.

The effect of trivalent cations on CMC solutions can be controlled and used to advantage where gelation is desired. Gels of varying texture can be produced by careful addition of certain salts of trivalent metals, such as aluminum. A gradual release of aluminum ions to a CMC solution will result in uniform crosslinking of the polymer molecules between carboxymethyl groups. A gradual release of aluminum ions can be accomplished by using a slowly soluble aluminum salt such as monobasic aluminum acetate, $AlOH(C_2H_3O_2)_2$; soluble salts such as aluminum sulfate, $Al_2(SO_4)_3$, in combination with appropriate chelating agents; or insoluble salts such as dihydroxyaluminum sodium carbonate (DASC), $Al(OH)_2OCOO^-Na^+$, followed by in situ formation of the soluble acid form of DASC.

Under one embodiment, the dentifrice composition degrades upon exposure to saliva. The dentifrice delivers the compounds which are useful for cleaning the teeth. The dentifrice under one embodiment, further comprises an abrasive selected from the group consisting of silica, calcium carbonate, calcium phosphates, and mixtures thereof.

Under one embodiment, the silica functions as an abrasive agent. Under another embodiment, the silica functions as a thickening agent. Under still another embodiment, the oral care composition comprises both an abrasive silica and a thickening silica.

The silica particle may be prepared by any means known or to be developed in the art, and may be surface modified, if desired, to increase the capacity of the particle to adhere to a tooth surface. Examples may be found in, e.g., U.S. Patent Application Publication No. 20070104660, the contents of which are incorporated herein by reference. The silica particle is present in the composition in an amount of 5% or greater by weight of the total composition. Alternatively, the silica particle may be present in an amount of 5%, 6%, 7%, 8%, 9%, 10%, 15%, 20% or 25% by a weight.

Under one embodiment, the silica comprises precipitated silica. Precipitated silica is an amorphous form of silica (silicon dioxide, $SiO_2$), which is a white, powdery material. Precipitated silica is produced by precipitation from a solution containing silicate salts. Under one embodiment, the production of precipitated silica starts with the reaction of an alkaline silicate solution with a mineral acid. Sulfuric acid and sodium silicate solutions are added simultaneously with agitation to water, followed by precipitation carried out under alkaline conditions. The choice of agitation, duration of precipitation, the addition rate of reactants, their temperature and concentration, and pH can vary the properties of the silica. The formation of a gel stage is avoided by stirring at elevated temperatures. The resulting white precipitate is filtered, washed, and dried in the manufacturing process.

Under one embodiment, the silica comprises fumed silica. Fumed silica, also known as pyrogenic silica because it is produced in a flame, consists of microscopic droplets of amorphous silica fused into branched, chainlike, three-dimensional secondary particles which then agglomerate into tertiary particles. The resulting powder has an extremely low bulk density and high surface area. Its three-dimensional structure results in viscosity-increasing, thixotropic behavior when used as a thickener or reinforcing filler. Fumed silica has a very strong thickening effect. Primary particle size is 5-50 nm. The particles are non-porous and have a surface area of 50-600 $m^2/g$. The density is 160-190 $kg/m^3$.

Examples of silica include ZEODENT® 105-High, ZEODENT® 103, ZEODENT® 113, ZEODENT® 115, ZEODENT® 116, ZEODENT®117, ZEODENT® 120, ZEODENT® 124, ZEODENT® 153, ZEODENT® 163, ZEODENT® 165, ZEODENT® 167, ZEODENT® 168, ZEODENT® 203, ZEODENT®9175, available from Evonik; SYLODENT® 750 Silica, SYLODENT® 753 Silica, SYLODENT® 756 Silica, SYLOBLANC® 81 Silica, SYLODENT® SM 850C Silica, SYLOBLANC® 82 Silica, SYLODENT® SM 500T Silica, SYLODENT® SM 614T Silica, available from W. R. Grace; Tixosil® 63, Tixosil® 73, Tixosil® SoftClean™, Tixosil® 331, Tixosil® 43, available from Solvay; SORBOSIL AC33, SORBOSIL AC43, SORBOSIL BFG10, SORBOSIL BFG50, SORBOSIL BFG51, SORBOSIL BFG52, SORBOSIL BFG54, SORBOSIL CBT60S, SORBOSIL CBT70, SORBOSIL BFG100, available from PQ Corporation.

Under one embodiment, the silica comprises Sorbosil AC43 silica, available from PQ Corporation. In an embodiment, AC43 silica has properties including, an average particle size of 2.7 to 4.0 microns (as determined by MALVERN MASTERSIZER), a sieve residue of +45 µm, a moisture loss at 105° C. of 8.0% max, an ignition loss at 1000° C. of 14.0% max, and a pH of 5.5 to 7.5 in aqueous suspension.

Under one embodiment, the thickener silica is a synthetic amorphous precipitated material of high surface area and internal pore volume to provide water absorption of about 50 ml or greater/20 grams of silica and oil absorption of about 200 ml or greater/100 g silica (per ASTM D281 method). Examples of thickener silicas which may be used are Zeodent® 165, Zeodent® 163 and Zeodent® 153; Aerosil® 200 and Sident® 22S (available from Evonik); Sylodent® 15 and Perkasil® SM 660 (available from W.R. Grace & Co.); MFIL®, MFIL® (available from Madhu Silica, India) and Tixocil 43B (available from Rhodia).

Under one embodiment, suitable silica particles for oral compositions of the invention include silica particles with, for example, a particle size distribution of 3 to 4 microns, or alternatively, a particle size distribution of 5 to 7 microns, alternatively, a particle size distribution of 3 to 5 microns, alternatively, a particle size distribution of 2 to 5 microns, or alternatively, a particle size distribution of 2 to 4 microns.

In an embodiment, a silica particle has a particle size of 2.0 microns. In another embodiment, a silica particle has a particle size of 2.5 microns. In another embodiment, a silica particle has a particle size of 3.0 microns. In another embodiment, a silica particle has a particle size of 3.5 nm microns. In another embodiment, a silica particle has a particle size of 4.0 microns. In another embodiment, a silica particle has a particle size of 4.5 microns. In another embodiment, a silica particle has a particle size of 5.0 microns. In an aspect of the invention, the silica particle size is a median particle size. In another aspect, the silica particle size is an average (mean) particle size. In an embodiment, the silica particle comprises at least 5%, at least 10%, at least 15%, at least 20%, at least 25%, at least 30%, at least 35%, or at least 40% of the total silica particles in a silica particle-containing composition. In an aspect of the invention, the silica particles have a porosity of less than about 0.45 mL/g in pores of about 600 Angstroms or smaller.

Under one embodiment, the dentifrice further comprises an active oral health agent selected from the group consisting of a vitamin, ascorbic acid, flavonoid, flavanol, flavones, procyanidins, flavoring and mixtures thereof.

A vitamin is an organic molecule (or related set of molecules) that is an essential micronutrient that an organism needs in small quantities for the proper functioning of its metabolism. The term vitamin is interpreted broadly, and include vitamins, vitamers, metabolites thereof, and precursors thereof. Examples of vitamins which may be included in the dentifrice include vitamin A, all-trans-retinol, retinal, provitamin A-functioning carotenoid, all-trans-beta-carotene, vitamin B1, thiamine, vitamin B2, riboflavin, vitamin B3, niacin, niacinamide, nicotinamide riboside, vitamin B5, pantothenic acid, vitamin B6, pyridoxine, pyridoxamine, pyridoxal, vitamin B7, biotin, vitamin B9, folates, folic acid, vitamin B12, cyanocobalamin, hydroxocobalamin, methylcobalamin, adenosylcobalamin, vitamin C, ascorbic acid, vitamin D, cholecalciferol, ergocalciferol, vitamin E, tocopherols, tocotrienols, vitamin K, phylloquinone, menaquinones, their precursors, their metabolites, and mixtures thereof.

Flavonoids are a class of polyphenolic plant and fungus secondary metabolites. Flavonoids have the general structure of a 15-carbon skeleton, which consists of two phenyl rings (A and B) and a heterocyclic ring (C). This carbon structure can be abbreviated C6-C3-C6. Ring A usually shows a phloroglucinol substitution pattern. Suitable flavonoids include bioflavonoids, isoflavonoids derived from 3-phenylchromen-4-one (3-phenyl-1,4-benzopyrone), neoflavonoids derived 4-phenylcoumarine (4-phenyl-1,2-benzopyrone). Under one embodiment, glavonoid are ketone-containing compounds and as such, anthoxanthins (flavones and flavonols).

Under one embodiment, flavonoid and bioflavonoid are non-ketone polyhydroxy polyphenol compounds, such as flavanoids. Examples of suitable flavonoids include anthocyanidins, anthoxanthins, flavanones, flavanonols, flavans, and isoflavonoids. Examples of suitable anthocyanidins include cyanidin, delphinidin, malvidin, pelargonidin, peonidin, and petunidin. Examples of suitable anthoxanthins include luteolin, apigenin, tangeritin, quercetin, kaempferol, myricetin, fisetin, galangin, isorhamnetin, pachypodol, rhamnazin, pyranoflavonols, and furanoflavonols. Examples of suitable flavanones include hesperetin, naringenin, eriodictyol, and homoeriodictyol. Examples of suitable flavanonols include taxifolin, dihydroquercetin, dihydrokaempferol. Examples of suitable flavans include flavan-3-ol, flavan-4-ol, flavan-3,4-diol, leucoanthocyanidin, catechin, gallocatechin, catechin 3-gallate, gallocatechin 3-gallate, epicatechins, epigallocatechin, epicatechin 3-gallate, epigallocatechin 3-gallate, theaflavin, theaflavin-3-gallate, theaflavin-3'-gallate, theaflavin-3,3'-digallate, thearubigin, and proanthocyanidin. Examples of isoflavonoids include genistein, daidzein, glycitein, isoflavanes, isoflavandiols, isoflavenes, coumestans, and pterocarpans.

Procyanidins are members of the proanthocyanidin (or condensed tannins) class of flavonoids. They are oligomeric compounds, formed from catechin and epicatechin molecules. Procyanidins yield cyanidin when depolymerized under oxidative conditions.

The present invention is also directed to a method for reducing bacterial growth, cleaning teeth, removing dental plaque, reducing dental erosion, treating gingivitis, or reducing tooth decay in an oral cavity of a patient, comprising contacting teeth of a patient with the dental hygiene appliance.

The method includes contacting teeth of the patient with the dental hygiene appliance. Under one embodiment, the teeth are contacted repeatedly, on different parts of teeth and on different parts of the dental hygiene appliance.

The mushroom-shaped bristle scrape the teeth to break the biofilm, or to deliver the dentifrice to the teeth, or any part of the teeth. The mushroom-shaped bristle deform to accommodate the teeth. The deformation, under one embodiment, is reversible, meaning that the tooth pushes the mushroom-shaped bristles to deform, and after the teeth are dissociated from the dental hygiene appliance, the mushroom-shaped bristle pop back up into their original shape.

There are several deformations that are characteristic of the use of the dental hygiene appliance.

One kind of deformation during the use of the dental hygiene appliance is the deformation of the pad base 11. The pad base may twist or bend to accommodate the tooth.

Another kind of deformation during the use of the dental hygiene appliance is the bend of the stipe with respect to the base pad top surface of the base pad bottom surface. This may be done by bending of the stipe at the stipe bottom 54, where the stipe meets the base pad.

Another kind of deformation during the use of the dental hygiene appliance is the bend of the stipe with respect to the pileus. This may be done by bending of the stipe at the stipe top 56, where the stipe meets the pileus.

Another kind of deformation during the use of the dental hygiene appliance is the due to the bending or twisting of the stipe. The stipe may bend gradually along its length.

Another kind of deformation during the use of the dental hygiene appliance is the deformation of the pileus 51.

Another kind of deformation during the use of the dental hygiene appliance is the deformation of the brim 60.

The present invention is also directed to the method for reducing bacterial growth, cleaning teeth, removing dental plaque, reducing dental erosion, treating gingivitis, or reducing tooth decay in an oral cavity of a patient, comprising contacting teeth of a patient with the dental hygiene appliance, wherein the patient is a vertebrate. The term "patient" means any animal whose teeth are being sought to be cleaned. A vertebrate is an animal of a large group distinguished by the possession of a backbone or spinal column, including mammals. The vertebrates which the method is useful for are those vertebrates with teeth, such as mammals.

The method is suitable for use with a human or an animal. Under one embodiment, the patient is a companion animal or a farm animal.

The phrase "a companion animal" refers to a domesticated or domestic-bred animal whose physical, emotional, behavioral and social needs can be readily met as companions in a home, or in close daily relationships with one or more humans. Under one embodiment, species included in the definition of a companion animal include dogs, canines, cats, felines, horses, rabbits, ferrets, guinea pigs, and select other small mammals.

The phrase "farm animal" refers to an animal that is kept on farms for productive purposes. Under one embodiment, a farm animal includes a dog (*Canis lupus familiaris*), goat (*Capra aegagrus hircus*), domestic pig (*Sus scrofa domesticus*), sheep (*Ovis aries*), cattle (*Bos taurus*), zebu (*Bos taurus indicus*), cat (*Felis catus*), domestic guinea pig (*Cavia porcellus*), donkey (*Equus africanus asinus*), water buffalo (*Bubalus bubalis*), dromedary camel (*Camelus dromedarius*), horse (*Equus ferus caballus*), yak (*Bos grunniens*), domestic bactrian camel (*Camelus bactrianus*), llama (*Lama glama*), alpaca (*Vicugna pacos*), domestic guineafowl (*Numida meleagris*), fuegian dog (*Lycalopex culpaeus*)†, ferret (*Mustela putorius furo*), Bali cattle (*Bos javanicus domesticus*), gayal (*Bos frontalis*), domestic rabbit (*Oryctolagus cuniculus*), fancy mouse and laboratory mouse (*Mus musculus domestica*), fancy rat and laboratory rat (*Rattus norvegicus domestica*), domestic mink (*Neovison vison domesticus*), domesticated red fox (*Vulpes vulpes*), domestic hedgehog (*Atelerix albiventris*), domestic skunk (*Mephitis mephitis*), and like.

The phrase "farm animal" refers to animals that are semi-domisticated, undomesticated but captive-bred on a commercial scale, commonly wild-caught, occasionally captive-bred, and tameable.

The definition of the term "dog" includes a companion dog, a guard dog, a hunting dog, a herding dog, and a working dog. The definition of the term "dog" includes members of dogs breeds such as Affenpinscher, Afghan Hound, Afghan Shepherd, Aidi, Airedale Terrier, Akbash, Akita, Alano Español, Alaskan husky, Alaskan Klee Kai, Alaskan Malamute, Alopekis, Alpine Dachsbracke, American Akita, American Bulldog, American Bully, American Cocker Spaniel, American English Coonhound, American Eskimo Dog, American Foxhound, American Hairless Terrier, American Pit Bull Terrier, American Staffordshire Terrier, American Water Spaniel, Anatolian Shepherd Dog, Andalusian Hound, Anglo-Français de Petite Vénerie, Appenzeller Mountain Dog, Ariegeois, Armant, Armenian Gampr dog, Artois Hound, Australian Cattle Dog, Australian Kelpie, Australian Shepherd, Australian Stumpy Tail Cattle Dog, Australian Terrier, Austrian Black and Tan Hound, Austrian Pinscher, Azawakh, Bakharwal, Barbado da Terceira, Barbet, Basenji, Basque Shepherd Dog, Basset Artésien Normand, Basset Bleu de Gascogne, Basset Fauve de Bretagne, Basset Hound, Bavarian Mountain Hound, Beagle, Beagle-Harrier, Bearded Collie, Beauceron, Bedlington Terrier, Belgian Shepherd Dog (Groenendael), Belgian Shepherd Dog (Laekenois), Belgian Shepherd Dog (Malinois), Belgian Shepherd Dog (Tervuren), Bergamasco Shepherd, Berger Blanc Suisse, Berger Picard, Bernese Mountain Dog, Bichon Frisé, Billy, Black and Tan Coonhound, Black and Tan Virginia Foxhound, Black Mouth Cur, Black Norwegian Elkhound, Black Russian Terrier, Bloodhound, Blue Heeler, Blue Lacy, Blue Picardy Spaniel, Blueetick Coonhound, Boerboel, Bohemian Shepherd, Bolognese, Border Collie, Border Terrier, Borzoi, Bosnian Coarsehaired Hound, Boston Terrier, Bouvier des Ardennes, Bouvier des Flandres, Boxer, Boykin Spaniel, Bracco Italiano, Braque d'Auvergne, Braque de l'Ariege, Braque du Bourbonnais, Braque Francais, Braque Saint-Germain, Briard, Briquet Griffon Vendéen, Brittany, Broholmer, Bruno Jura Hound, Brussels Griffon, Bucovina Shepherd Dog, Bull Terrier, Bulldog, Bullmastiff, Bully Kutta, Burgos Pointer, Cairn Terrier, Canaan Dog, Canadian Eskimo Dog, Cane Corso, Cantabrian Water Dog, Cão da Serra de Aires, Cão de Castro Laboreiro, Cão de Gado Transmontano, Cão Fila de São Miguel, Carolina Dog, Carpathian Shepherd Dog, Catalan Sheepdog, Caucasian Shepherd Dog, Cavalier King Charles Spaniel, Central Asian Shepherd Dog, Cesky Fousek, Cesky Terrier, Chesapeake Bay Retriever, Chien Français Blanc et Noir, Chien Français Blanc et Orange, Chien Français Tricolore, Chihuahua, Chilean Terrier, Chinese Chongqing Dog, Chinese Crested Dog, Chinese Imperial Dog, Chinook, Chippiparai, Chow Chow, Cierny Sery, Cimarrón Uruguayo, Cirneco dell'Etna, Clumber Spaniel, Collie, Rough, Collie, Smooth, Combai, Coton de Tulear, Cretan Hound, Croatian Sheepdog, Curly-Coated Retriever, Cursinu, Czechoslovakian Wolfdog, Dachshund, Dalmatian, Dandie Dinmont Terrier, Danish-Swedish Farmdog, Deutsche Bracke, Doberman Pinscher, Dogo Argentino, Dogo Guatemalteco, Dogo Sardesco, Dogue Brasileiro, Dogue de Bordeaux, Drentse Patrij shond, Dreyer, Dunker, Dutch Shepherd, Dutch Smoushond, East European Shepherd, East Siberian Laika, Elo, English Cocker Spaniel, English Foxhound, English Mastiff, English Pointer, English Setter, English Shepherd, English Springer Spaniel, English Toy Terrier (Black & Tan), Entlebucher Mountain Dog, Estonian Hound, Estrela Mountain Dog, Eurasier, Eurohound, Field Spaniel, Fila Brasileiro, Finnish Hound, Finnish Lapphund, Finnish Spitz, Flat-Coated Retriever, Fox Terrier, Smooth, Fox Terrier, Wire, French Brittany, French Bulldog, French Spaniel, Gaddi Kutta, Galgo Espanol, Galician Shepherd Dog, Garafian Shepherd, Gascon Saintongeois, Georgian Shepherd, German Longhaired Pointer, German Pinscher, German Roughhaired Pointer, German Shepherd Dog, German Shorthaired Pointer, German Spaniel, German Spitz, German Wirehaired Pointer, Giant Schnauzer, Glen of Imaal Terrier, Golden Retriever, Gordon Setter, Gran Mastin de Borinquen, Grand Anglo-Français Blanc et Noir, Grand Anglo-Français Blanc et Orange, Grand Anglo-Français Tricolore, Grand Basset Griffon Vendéen, Grand Bleu de Gascogne, Grand Griffon Vendéen, Great Dane, Great Pyrenees, Greater Swiss Mountain Dog, Greek Harehound, Greek Shepherd, Greenland Dog, Greyhound, Griffon Bleu de Gascogne, Griffon Fauve de Bretagne, Griffon Nivernais, Gull Terrier, Hamiltonstövare, Hanover Hound, Harrier, Havanese, Himalayan Sheepdog, Hokkaido, Hortaya borzaya, Hovawart, Huntaway, Hygen Hound, Ibizan Hound, Icelandic Sheepdog, Indian pariah dog, Indian Spitz, Irish Red and White Setter, Irish Setter, Irish Terrier, Irish Water Spaniel, Irish Wolfhound, Istrian Coarse-haired Hound, Istrian Short-haired Hound, Italian Greyhound, Jack Russell Terrier, Jagdterrier, Japanese Chin, Japanese Spitz, Japanese Terrier, Jindo, Jonangi, Kai Ken, Kaikadi, Kangal Shepherd Dog, Kanni, Karakachan dog, Karelian Bear Dog, Karelo-Finnish Laika, Karst Shepherd, Keeshond, Kerry Beagle, Kerry Blue Terrier, King Charles Spaniel, King Shepherd, Kintamani, Kishu Ken, Komondor, Koolie, Koyun dog, Kromfohrländer, Kumaon Mastiff, Kunming Wolfdog, Kuvasz, Kyi-Leo, Labrador Husky, Labrador Retriever, Lagotto Romagnolo, Lakeland Terrier, Lancashire Heeler, Landseer, Lapponian Herder, Large Münsterländer, Leonberger, Lhasa Apso, Lithuanian Hound, Louisiana Catahoula Leopard Dog, Löwchen, Lupo Italiano, Mackenzie River husky, Magyar agár, Mahratta Greyhound, Maltese, Maremma Sheepdog, McNab, Miniature American Shepherd, Miniature Bull Terrier, Miniature Fox Terrier, Miniature Pinscher, Miniature Schnauzer, Miniature Shar Pei, Montenegrin Mountain Hound, Moscow Watchdog, Mountain Cur, Mucuchies, Mudhol Hound, Mudi, Neapolitan Mastiff, Nederlandse Kooikerhondj e, Nenets Herding Laika, New Guinea singing dog, New Zealand Heading Dog, Newfoundland, Norfolk Terrier, Norrbottenspets, Northern Inuit Dog, Norwegian Buhund, Norwegian Elkhound, Norwegian Lundehund, Norwich Terrier, Nova Scotia Duck Tolling Retriever, Old Croatian Sighthound, Old Danish Pointer, Old English Sheepdog, Old English Terrier, Old German Shepherd Dog, Old Time Farm Shepherd, Olde English Bulldogge, Otterhound, Pachon Navarro, Pandikona, Papillon, Parson Russell Terrier, Pastore della Lessinia e del Lagorai, Patterdale Terrier, Pekingese, Perro de Pastor Mallorquin, Perro de Presa Canario, Perro de Presa Mallorquin, Peruvian Inca Orchid, Petit Basset Griffon Vendéen, Petit Bleu de Gascogne, Phalène, Pharaoh Hound, Phu Quoc Ridgeback, Picardy Spaniel, Plott Hound, Plummer Terrier, Podenco Canario, Poitevin, Polish Greyhound, Polish Hound, Polish Hunting Dog, Polish Lowland Sheepdog, Polish Tatra Sheepdog, Pomeranian, Pont-Audemer Spaniel, Poodle, Porcelaine, Portuguese Podengo, Portuguese Pointer, Portuguese Water Dog, Pražský Krysařík, Pudelpointer, Pug, Puli, Pumi, Pungsan, Pyrenean Mastiff, Pyrenean Shepherd, Rafeiro do Alentejo, Rajapalayam, Rampur Greyhound, Rat Terrier, Ratonero Bodeguero Andaluz, Ratonero Mallorquin, Ratonero Murciano de Huerta, Ratonero Valenciano, Redbone Coonhound, Rhodesian Ridgeback, Romanian Raven Shepherd Dog, Rottweiler, Russell Terrier, Russian Salon Dog, Russian Spaniel, Russian Toy, Russian Tsvetnaya Bolonka, Russo-European Laika, Saarloos Wolfdog, Sabueso Español, Sabueso fino Colombiano, Saint Bernard, Saint-Usuge Spaniel, Saluki, Samoyed, Sapsali, Sarplaninac, Schapendoes, Schillerstövare, Schipperke, Schweizer Laufhund, Schweizerischer Niederlaufhund, Scotch Collie, Scottish Deerhound, Scottish Terrier, Sealyham Terrier, Segugio Italiano, Segugio Maremmano, Seppala Siberian Sleddog, Serbian Hound, Serbian Tricolour Hound, Shar Pei, Shetland Sheepdog, Shiba Inu, Shih Tzu, Shikoku, Shiloh Shepherd, Siberian Husky, Silken Windhound, Silky Terrier, Sinhala Hound, Skye Terrier, Sloughi, Slovakian Wirehaired Pointer, Slovensky Cuvac, Slovensky Kopov, Smålandsstövare, Small Greek Domestic Dog, Small Münsterländer, Soft-Coated Wheaten Terrier, South Russian Ovcharka, Spanish Mastiff, Spanish Water Dog, Spinone Italiano, Sporting Lucas Terrier, Stabyhoun, Staffordshire Bull Terrier, Standard Manchester Terrier, Standard Schnauzer, Stephens Cur, Styrian Coarse-haired Hound, Sussex Spaniel, Swedish Elkhound, Swedish Lapphund, Swedish Vallhund, Taigan, Taiwan Dog, Tamaskan Dog, Teddy Roosevelt Terrier, Telomian, Tenterfield Terrier, Terrier Brasileiro, Thai Bangkaew Dog, Thai Ridgeback, Tibetan Mastiff, Tibetan Spaniel, Tibetan Terrier, Tosa, Toy Fox Terrier, Toy Manchester Terrier, Transylvanian Hound, Treeing Cur, Treeing Tennessee Brindle, Treeing Walker Coonhound, Trigg Hound, Tyrolean Hound, Vanjari Hound, Villano de Las Encartaciones, Villanuco de Las Encartaciones, Vizsla, Volpino Italiano, Weimaraner, Welsh Corgi, Cardigan, Welsh Corgi, Pembroke, Welsh Sheepdog, Welsh Springer Spaniel, Welsh Terrier, West Highland White Terrier, West Siberian Laika, Westphalian Dachsbracke, Wetterhoun, Whippet, White Shepherd, Wirehaired Pointing Griffon, Wirehaired Vizsla, Xiasi Dog, Xoloitzcuintli, Yakutian Laika, Yorkshire Terrier, and a mixture of any of these breeds. The term "canine" includes the definition of a dog.

The definition of the term "cat" includes a domestic cat, *Felis catus*, and *Felis silvestris catus*. The definition of the term "cat" includes a house cat and a feral cat. The definition of the term cat includes breeds such as Abyssinian, Aegean, American Curl, American Bobtail, American Shorthair, American Wirehair, Aphrodite Giant, Arabian Mau, Australian Mist, Asian, Asian Semi-longhair, Balinese, Bambino, Bengal, Birman, Bombay, Brazilian Shorthair, British Angora, British Semi-longhair, British Shorthair, British Longhair, Burmese, Burmilla, California Spangled, Chantilly-Tiffany, Chartreux, Chausie, Cheetoh, Colorpoint Shorthair, Colorpoint Persian, Cornish Rex, Cymric, Cyprus, Devon Rex, Donskoy, Don Sphynx, Dragon Li, Dwelf, Egyptian Mau, European Shorthair, Exotic Shorthair, Foldex, Foreign Longhair, German Rex, Havana Brown, Highlander, Himalayan, Japanese Bobtail, Javanese, Karelian Bobtail, Khao Manee, Korat, Korean Bobtail, Korn Ja, Kurilian Bobtail, Kuril Islands Bobtail, LaPerm, Liebling, Longhaired Manx, Lykoi, Maine Coon, Mandarin, Manx, Manx Longhair, Mekong Bobtail, Minskin, Munchkin, Nebelung, Napoleon, Norwegian Forest, Ocicat, Ojos Azules, Oregon Rex, Oriental Bicolor, Oriental Shorthair, Oriental Longhair, Persian, Peterbald, Pixie-bob, Raas, Ragamuffin, Ragdoll, Russian Blue, Russian Black, Russian Tabby, Russian White, Sam Sawet, Savannah, Scottish Fold, Selkirk Rex, Serengeti, Serrade petit, Siamese, Siberian, Siberian Forest, Neva Masquerade, Singapura, Snowshoe, Sokoke, Somali, Sphynx, Suphalak, Thai, Thai Lilac, Tonkinese, Toyger, Turkish Angora, Turkish Van, Ukrainian Levkoy, Wichien Maat, Wila Krungthep, York Chocolate, and a mixture of any of the breeds above. The term "feline" includes the definition of a cat.

EXPERIMENTAL

The interaction of calcium cation crosslinking alginate units to form a stable gel was investigated.

In the first experiment, 7.0 g of 3% calcium lactate in water was added rapidly to a stirred 35 g of 2% sodium alginate in water. A very rapid gel formation was observed.

In the second experiment, 7.2 g 3% calcium lactate in water and 3.0 g of 3% sodium citrate in water were added to 36.0 g of 2% sodium alginate in water. Slower gel formation was observed.

In the third experiment, 3.0 g 3% calcium lactate in water and 3.0 g of 3% sodium citrate in water were added to 32.0 g of 2% sodium alginate in water. The mixture observed better control and a better gelation rate.

In the fourth experiment, 6.1 g 3% calcium lactate in water and 6.07 g of 3% sodium citrate in water were added to 31.2 g of 2% sodium alginate in water. The results were comparable to those of the third experiment.

In the fifth experiment, 4.0 g 3% calcium lactate in water and 5.4 g of 3% sodium citrate in water were added to 31.0 g of 2% sodium alginate in water. The mixture observed better control and more solid ge.

In the sixth experiment, 5.0 g 3% calcium lactate in water and 6.4 g of 3% sodium citrate in water were added to 31.2 g of 2% sodium alginate in water. The mixture observed to provide good solid gel.

In the seventh experiment, 5.0 g 3% calcium lactate in water and 2.2 g of 30% sodium citrate in water were added to 31.2 g of 2% sodium alginate in water. The mixture observed to provide a better solid gel than in the sixth experiment.

In the eighth experiment, 10 g 3% calcium lactate in water was added rapidly to stirred 31.5 g of 5% carboxymethylcelulose in water. A small increase in viscosity was observed.

In the ninth experiment, 3.0 g of 15% $KAl(SO_4)_2$ in water was added rapidly to stirred 37.0 g of 5% carboxymethylcelulose in water. A rapid formation of very solid gel was observed.

In the tenth experiment, 3.0 g of 15% $KAl(SO_4)_2$ in water was added rapidly to the mixture of 35.4 g of 5% carboxymethylcelulose in water and 2.8 g of 30% sodium citrate in water. A formation of a very solid gel was observed.

In the eleventh experiment, 2.9 g of 15% $KAl(SO_4)_2$ in water was added rapidly to the mixture of 32.0 g of 5% carboxymethylcelulose in water and 2.9 g of 30% sodium citrate in water. The observations were better than in the tenth experiment, and the formation of a solid gel was observed.

In the twelfth experiment, 5.0 g of 15% $KAl(SO_4)_2$ in water was added rapidly to the mixture of 34.5 g of 5% carboxymethylcelulose in water and 1.54 g of 30% sodium citrate in water. The observations were better than those in the eleventh experiment, but a bit worse than of the ninth experiment.

In the thirteenth experiment, 3.2 g of 15% $KAl(SO_4)_2$ in water was added rapidly to the mixture of 32.7 g of 5% carboxymethylcelulose in water and 0.45 g of 30% sodium citrate in water. A gel which is very suitable for use in the dental hygiene appliance of the present is formed.

In the fourteenth experiment, 2.95 g of 15% $KAl(SO_4)_2$ in water was added rapidly to 29.0 g of 2% sodium alginate in water and 1.06 g of 30% sodium citrate in water. Some gellation was observed.

In the fifteenth experiment, 3.0 g of 15% $KAl(SO_4)_2$ in water was added rapidly to 28.8 g of 2% sodium alginate in water. Fast gel formation was observed.

In the sixteenth experiment, 3.0 g of 15% $KAl(SO_4)_2$ in water was added rapidly to the mixture of 15.2 g of 2% sodium alginate in water and 14.5 g of 5% carboxymethylcelulose in water. Solid gel formation was observed.

From the above experiments, the following conclusions may be made. Firstly, calcium cation crosslinks alginate units to form a stable gel. Addition of sodium citrate solution slows down the process.

Secondly, carboxymethylcelulose can be crosslinked with aluminum ions. Calcium ions seem to be much less effective. A mixture of both polymers can be crosslinked to form a useful product. Aluminum ions can be used to crosslinked alginate units.

A representative gelatin product for use in the dental hygiene appliance was prepared as follows. PEG 1000 (4.0 g), PEG 4000 (0.50 g), sodium benzoate (0.35 g), maltose (0.35 g) were added to 31.0 g of water and dissolved using a magnetic stirrer. Next, a chicken bouillon cube (2.5 g) was added to the mix during continued stirring. The liquid mix was added to gelatin (APO 300), and the mixture was allowed to swell at RT for 40 minutes. The brown mixture was heated to about 70° C. with mechanical mixing. The resulting gelatin product was added to gel products deriving from alginate and carboxymethylcelulose. Both products showed the compatibility of carboxylic acid-based materials with a gelatin product.

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

The invention claimed is:

1. A monofacial pad (10) for use in a dental hygiene appliance comprising:
   a pad base (11) comprising a pad base top surface (12); and
   a plurality of mushroom-shaped bristles (50) extending from the top surface (12), wherein the mushroom-shaped bristles (50) comprise a material with Shore 00 hardness between about 50 and about 100,
   wherein at least one of the mushroom-shaped bristles comprises a pileus (51) and a stipe (52), wherein the pileus comprises a distinct, flexible and thin brim extending outwardly in a flat plane from the pileus (60).

2. The pad of claim 1, wherein the brim (60) comprises an underbrim surface (61), and an overbrim surface (62), wherein biting of the pad by a patient provides a rubbing action of the underbrim surface or overbrim surface with the patient's teeth.

3. The pad of claim 1, wherein the material comprises polymer selected from the group consisting of polyalkenes, polyisoprene, polybutadiene, poly(alkyl acrylate and methacrylate), polyvinyl alcohol, polystyrene, styrene butadiene, polyesters, polyethylene terephthalate, polyamide, polyurea, polycarbonate, copolymers thereof, and mixtures thereof.

4. The pad of claim 1, wherein an interstitial space (80) between the mushroom-shaped bristles (50) comprises a dentifrice composition comprising an aqueous gel prepared from the group consisting of oligosaccharide, polysaccharide, starch, cellulose, sodium carboxymethyl cellulose, sodium alginate, polylactic acid, polygluconic acid, copolymers thereof, and mixtures thereof.

5. The pad or the dental hygiene appliance of claim 4, wherein the aqueous gel is prepared from the group consisting of sodium carboxymethyl cellulose, sodium alginate, polylactic acid, polygluconic acid, copolymers thereof, and mixtures thereof,
wherein the sodium carboxymethyl cellulose, sodium alginate, polylactic acid, polygluconic acid, copolymers thereof, and mixtures thereof are crosslinked via the addition of species that liberate divalent, trivalent or polyvalent ions.

6. The pad of claim 4, wherein the dentifrice composition degrades upon exposure to saliva.

7. The pad of claim 4, wherein the dentifrice composition further comprises an abrasive selected from the group consisting of silica, calcium carbonate, calcium phosphates, and mixtures thereof.

8. The pad of claim 4, wherein the dentifrice composition further comprises an active oral health agent selected from the group consisting of a vitamin, ascorbic acid, flavonoid, flavanol, flavones, procyanidins, flavoring and mixtures thereof.

9. The pad of claim 4, wherein the dentifrice composition further comprises activated edathamil.

10. The pad of claim 1, wherein an interstitial space (80) between the mushroom-shaped bristles (50) comprises a dentifrice composition comprising a gelatin cross-linked with cross-linking agents selected from the group consisting of polyethylene glycol, polypropylene glycol, glycerol, polyols, polyvinyl alcohol, diamine, triamine, polyamines and mixtures thereof.

11. A dental hygiene appliance comprising the pad of claim 1.

12. The dental hygiene appliance of claim 11, wherein the dental hygiene appliance is an animal toy, a chew toy, or a tug-of-war toy.

13. A method for reducing bacterial growth, cleaning teeth, removing dental plaque, reducing dental erosion, treating gingivitis, or reducing tooth decay in an oral cavity of a patient, comprising contacting teeth of a patient with the dental hygiene appliance of claim 11.

14. The method of claim 13, wherein the patient is a mammal that is a human, a companion animal, or a farm animal.

15. A bifacial pad (20) for use in a dental hygiene appliance comprising:
    a pad base (11) comprising a pad base top surface (12) and pad base bottom surface (22); and
    a plurality of mushroom-shaped bristles (50) extending from the pad base top surface (12) and the pad base bottom surface (22), wherein the mushroom-shaped bristles comprise a material with Shore 00 hardness between about 50 and about 100,
    wherein at least one of the mushroom-shaped bristles comprises a pileus (51) and a stipe (52), wherein the pileus comprises a distinct, flexible and thin brim distinct, flexible and thin (60).

16. A dental hygiene appliance (70) comprising a surface (72), and a plurality of mushroom-shaped bristles (50) extending from the surface, wherein the mushroom-shaped bristles comprise a material with Shore 00 hardness between about 50 and about 100, wherein at least one of the mushroom-shaped bristles (50) comprises a pileus (51) and a stipe (54), wherein the pileus comprises a distinct, flexible and thin brim extending outwardly in a flat plane from the pileus (60).

17. The dental hygiene appliance of claim 16, wherein the brim (60) comprises an underbrim surface (61), and an overbrim surface (62), wherein biting of the pad by a patient provides a rubbing action of the underbrim or overbrim with the patient's teeth.

18. The dental hygiene appliance of claim 16, wherein the material comprises polymer selected from the group consisting of polyalkenes, polyisoprene, polybutadiene, poly(alkyl acrylate and methacrylate), polyvinyl alcohol, polystyrene, styrene butadiene, polyesters, polyethylene terephthalate, polyamide, polyurea, polycarbonate, copolymers thereof, and mixtures thereof.

* * * * *